United States Patent
Aoyagi et al.

(10) Patent No.: US 7,489,678 B2
(45) Date of Patent: *Feb. 10, 2009

(54) VOICE PACKET COMMUNICATIONS SYSTEM WITH COMMUNICATIONS QUALITY EVALUATION FUNCTION

(75) Inventors: Hiromi Aoyagi, Kanagawa (JP); Atsushi Yokoyama, Saitama (JP); Nobuyuki Yamaguchi, Saitama (JP); Kazuyoshi Akie, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 581 days.

This patent is subject to a terminal disclaimer.

(21) Appl. No.: 11/039,884

(22) Filed: Jan. 24, 2005

(65) Prior Publication Data
US 2005/0129006 A1 Jun. 16, 2005

Related U.S. Application Data

(62) Division of application No. 09/989,402, filed on Nov. 21, 2001, now Pat. No. 6,885,659.

(30) Foreign Application Priority Data
Nov. 24, 2000 (JP) .............................. 2000-358222

(51) Int. Cl.
*H04L 12/64* (2006.01)
*H04M 3/22* (2006.01)
(52) U.S. Cl. .................... 370/352; 370/230.1; 370/252; 370/235; 370/394; 340/825.1; 375/240
(58) Field of Classification Search ......... 370/230–235, 370/352–356, 389, 392, 394, 400, 465, 521, 370/522; 375/240; 340/825.5, 825.51, 825.1
See application file for complete search history.

(56) References Cited

U.S. PATENT DOCUMENTS

| 5,130,985 A | 7/1992 | Kondo et al. |
| 6,885,659 B2 * | 4/2005 | Aoyagi et al. ............... 370/352 |
| 2004/0034492 A1 * | 2/2004 | Conway ...................... 702/81 |

FOREIGN PATENT DOCUMENTS

| JP | 03054931 A | 3/1991 |
| JP | 2000307637 A | 2/2000 |

* cited by examiner

*Primary Examiner*—Afsar M. Qureshi
(74) *Attorney, Agent, or Firm*—Venable LLP; James R. Burdett

(57) ABSTRACT

A voice packet communications system which objectively evaluates the voice quality in real time. Voice packets received from a network are input into an adjustment circuit. The adjustment circuit evens out the periods of the voice packets, detects the drop-out of voice packets, and inserts substitute packets in the voice packet sequence. Furthermore, the adjustment circuit outputs the number of voice packets that have dropped out, the number of substitute packets that have been inserted, and the number of voice packets that have accumulated inside the circuit, as quality information in each monitoring period. A decoding circuit converts the voice packets adjusted by the adjustment circuit into voice information. A judgment circuit calculates an index that indicates the communications quality of the voice packets from the quality information using a specified calculation formula.

4 Claims, 16 Drawing Sheets

FIG. 14
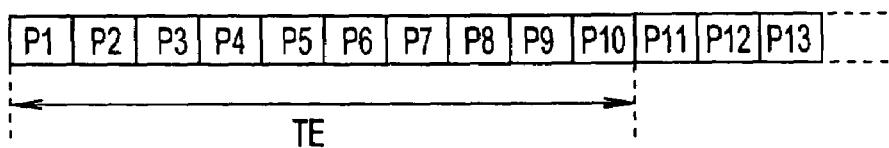
(A)
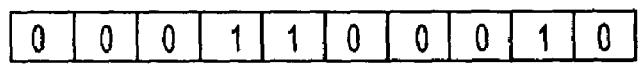
(B)
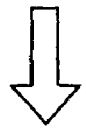
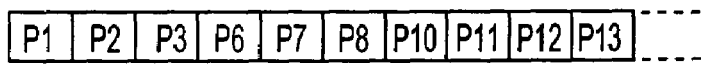
(C)
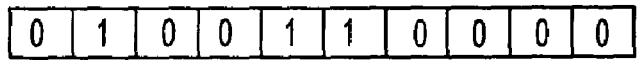
(D)
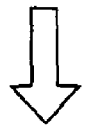
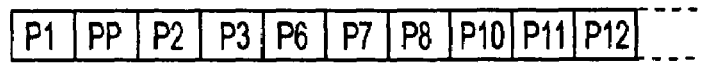
(E)
(F)

VOICE PACKET COMMUNICATIONS SYSTEM WITH COMMUNICATIONS QUALITY EVALUATION FUNCTION

This nonprovisional application is a divisional of U.S. application Ser. No. 09/989,402, filed Nov. 21, 2001.

BACKGROUND OF THE INVENTION

1. Field of the Invention

The present invention relates to a technique for evaluating the communications quality of voice packets. For example, the present invention can be applied to internet telephony or the like.

2. Description of Related Art

Techniques for voice communications utilizing networks such as the internet or the like are known. In voice communications of this type, voice information is compressed and encoded; this information is further formed into packets, and is transmitted via a network.

In the case of such voice communications via a network, the voice quality deteriorates as a result of packet dropout (i.e., packet loss), delay in transmission, fluctuation in transmission delay (i.e., jitter) and the like. The frequency of occurrence of packet dropout and the magnitude of the fluctuation in transmission delay vary at all times according to the network traffic. Accordingly, the voice quality varies according to such variations in frequency and magnitude.

In the case of multi-media communications that handle voice, images and the like, lossly compression is commonly used as the compression method. For example, a high compression rate of several tens of times to several hundred times can be obtained by lossly compression. In the case of lossless compression, on the other hand, a compression rate of several of times can be obtained. However, in the case of data compressed using lossly compression, there is a high probability that some of the information will drop out when the data become to be extracted. Accordingly, a technique for the objective evaluation of the effects of such dropout on communications quality is needed.

Currently, however, no technique exists for the objective measurement of voice quality in real time.

SUMMARY OF THE INVENTION

An object of the present invention is to provide a voice packet communications system which allows the objective measurement of voice quality in real time.

The voice packet communications system of the first invention comprises an adjustment circuit which evens out the periods of voice packets received from a network, detects the dropout of voice packets, inserts substitute packets into the voice packet sequence, and outputs quality information that contains information concerning dropout of the voice packets and information concerning insertion of the substitute packets; a decoding circuit which converts voice packets adjusted by the adjustment circuit into voice information; and a judgement circuit which judges the communications quality of voice packets using quality information.

The first invention makes it possible to measure voice quality objectively in real time by judging the communications quality of the voice packets using quality information.

The voice packet communications system of the second invention comprises an adjustment circuit which evens out the periods of voice packets received from a network, and inserts substitute packets into the voice packet sequence; a decoding circuit which converts voice packets adjusted by the adjustment circuit into voice information; and a judgement circuit which judges the communications quality of voice packets by comparing voice information with reference voice information received from the network in accordance with a quality assurance type protocol.

The second invention makes it possible to judge the communications quality of voice packets objectively in real time by comparing voice information with reference voice information received from the network in accordance with the quality assurance type protocol.

The voice packet communications system of the third invention comprises an adjustment circuit which evens out the periods of voice packets received from a network, detects the dropout of voice packets, inserts substitute packets into the voice packet sequence, and outputs quality information that contains information concerning dropout of the voice packets and information concerning insertion of the substitute packets; a decoding circuit which converts voice packets adjusted by the adjustment circuit into voice information; and a judgement circuit which judges the communications quality of voice packets by comparing reference voice information that has been modified according to the quality information with unmodified reference voice information.

The third invention makes it possible to judge the communications quality of voice packets objectively in real time by comparing reference voice information that has been modified according to quality information with unmodified reference voice information.

BRIEF DESCRIPTION OF THE DRAWINGS

Other objects and advantages of the present invention will be described with reference to the following appended figures.

FIGS. 12, 13 and 14 are schematic diagrams which are used to illustrate the operation of the voice packet communications system of the fifth embodiment;

DESCRIPTION OF THE PREFERRED EMBODIMENTS

Figure 1:
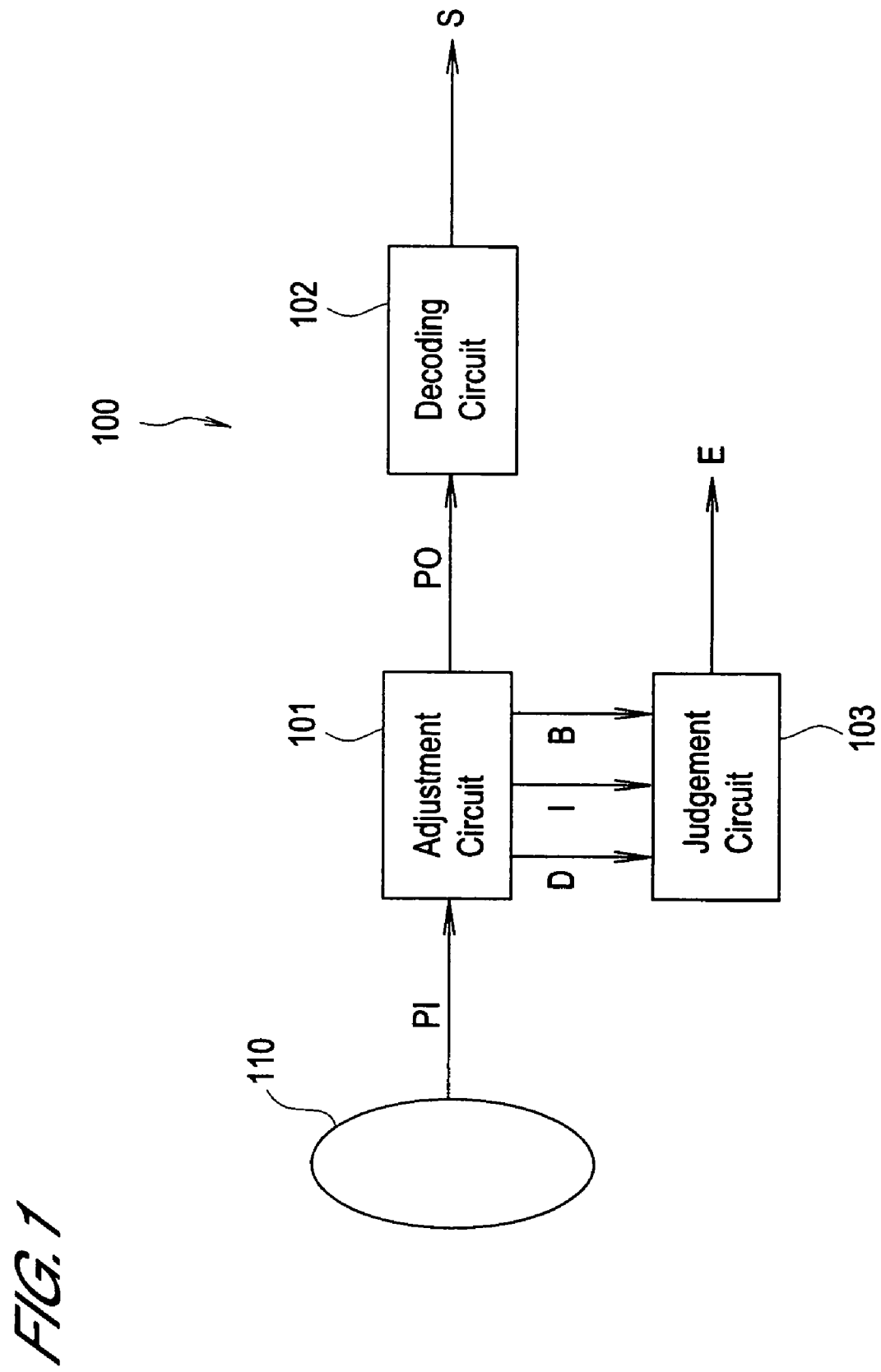
FIGS. 1 and 2 are block diagrams which illustrate the construction of essential parts of a voice packet communications system constituting a first embodiment of the present invention.

Embodiments of the present invention are now explained with reference to the drawings. The size, shape and positional relationship of the respective structural components in the drawings are merely shown schematically such that the present invention may be comprehended, and the numerical conditions described below are only exemplifications thereof.

First Embodiment

FIG. 1 is a block diagram which illustrates the construction of essential parts of the voice packet communications device 100 of the present embodiment in schematic form.

The voice packet communications device is constructed according to the VoIP (voice over internet protocol). This communications device 100 is used to perform voice communications in both directions via the internet. Accordingly, the voice packet communications device comprises a packet transmitting device and a packet receiving device. The communications device 100 performs packet communications with other communications devices via an IP communications network 110 such as the internet or the like. For example, the communications device 100 is realized by means of a personal computer.

In the present embodiment, monitoring of the communications quality is performed only by the packet receiving device, and is not performed by the packet transmitting device. Accordingly, the construction of the packet transmitting device is not limited in the present embodiment. Ordinarily, in cases where bi-directional communications are performed via the internet, the route used in communications in one direction and the route used in communications in the other direction are the same. As a result, in these routes, the router used to transmit voice packets is also the same. Accordingly, it would appear that the results of communications quality evaluation would also be the same in most cases. The reason for this is that a deterioration in communications quality is thought to be caused mainly by the processing capacity of the router. In cases where the processing capacity of the router is low, packet dropout and delay tend to occur.

As is shown in FIG. 1, the communications device 100 comprises a voice packet adjustment circuit 101, a voice decoding circuit 102, and a communications quality judgement circuit 103.

The voice packet adjustment circuit receives voice packets PI from the network 110, and outputs these voice packets to the voice decoding circuit 102 at specified time intervals. In a communications network such as the internet or the like, the reception interval of the packets is not guaranteed. Accordingly, the communications device 100 receives voice packets PI at irregular intervals. Consequently, in order to realize high-quality voice communications, the voice packet adjustment circuit 101 converts the voice packets PI received at irregular intervals into a voice packet sequence with a uniform time spacing. In the following description, this time spacing will be referred to as the decoding period T. Specifically, voice packets PO are output from the voice packet adjustment circuit 101 at every decoding period T. In addition, at every monitoring period TE, the voice packet adjustment circuit 101 outputs the number D of dropped-out voice packets PI, the number I of inserted substitute voice packets, and the number B of internally accumulated voice packets PI. The drop-out number D, the insertion number I and the cumulative number B will be described in detail later.

The voice decoding circuit 102 receives voice packets PO from the voice packet adjustment circuit 101. Voice information is stored in a compressed and encoded state in each voice packet PO. The voice decoding circuit 102 extracts and decodes the voice information of the voice packets PO. As a result, voice information S is produced. The quality of the voice information S is improved by fixing the reception period of the voice packets PO. For example, the voice decoding circuit operates according to a standard such as G.729 or G.723.1 of ITU-T (International Telecommunications Union-Telecommunications Service Sector) Standards. In the case of G.729, the decoding period T is 0.01 seconds; in the case of G.723.1, the decoding period T is 0.03 seconds.

The communications quality judgement circuit 103 inputs the drop-out number D, the insertion number I and the cumulative number B from the voice packet adjustment circuit 101 in each monitoring period TE. In addition, the judgement circuit 103 calculates a communications quality index E using the input information D, I and B for each monitoring period TE. The details of the method used to calculate the communications quality index E will be described later.

Finally, the voice information is converted into voice by the voice decoding circuit 102. Accordingly, even if a portion of the voice data drops out when the voice information is extracted and decoded, there is no problem as long as this drop-out only occurs to an extent that cannot be detected by the human auditory sense. Accordingly, in ordinary voice communications, more importance is attached to increasing the compression rate than to suppressing data loss. The efficiency of data communications is substantially increased as the size of the voice data is reduced; accordingly, deterioration in communications quality caused by voice delay is suppressed. Consequently, in most cases, lossly compression is used as the compression system. In cases where the drop-out and delay of voice data are extremely prevalent, i. e., in cases where these phenomena occur to an extent that can be distinguished by a human being, the communications quality deteriorates. The communications device 100 of the present embodiment can calculate a numerical value, i. e., the communications quality index E, for the objective evaluation of this communications quality. Using this communications quality index E, the voice quality can be distinguished objectively and in real time.

Figure 2:
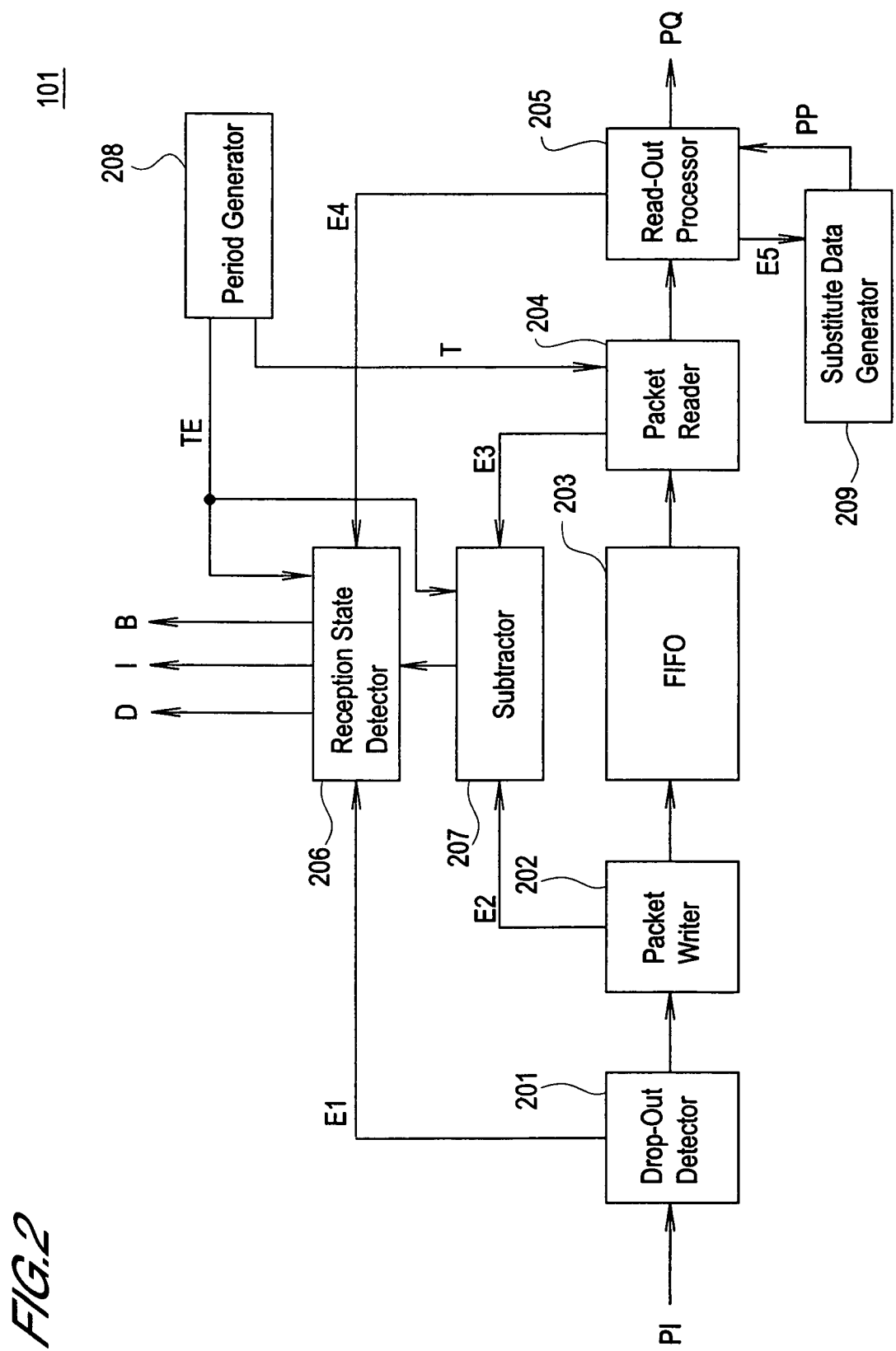

FIG. 2 is a block diagram which illustrates an example of the internal construction of the voice packet adjustment circuit 101 in schematic terms.

As is shown in FIG. 2, the voice packet adjustment circuit 101 comprises a drop-out detector 201, a packet writer 202, an FIFO (first-in first-out) memory 203, a packet reader 204, a read-out processor 205, a reception state detector 206, a subtractor 207, a period generator 208 and a substitute data generator 209.

The drop-out detector 201 receives voice packets PI from the network 110. Then, this detector 201 detects whether or not there is any drop-out in the voice packets PI thus received. Serial numbers, time stamps or the like contained in the voice packets PI are used for this detection. These serial numbers or time stamps are stored in the voice packets PI by the packet transmitting device. For example, in a case where a voice packet PI in which the number 1 is stored, a voice packet P2 in which the number 2 is stored, and a voice packet P3 in which the number 3 is stored, are received in this order, and a voice packet P5 in which the number 5 is stored is subsequently received, it is judged that a voice packet in which the number 4 is stored has dropped out in the network 110. The result of the detection of this drop-out is output as a detection signal E1. Specifically, each time that such a drop-out is detected, the drop-out detector 201 outputs a detection signal E1 to the reception state detector 206.

The packet writer 202 successively receives voice packets PI from the drop-out detector 201. The packet writer 202 writes these voice packets into the FIFO memory 203. Each time that the packet writer 202 performs writing into the FIFO memory 203, a write signal E2 is output to the subtractor 207.

The FIFO memory 203 holds voice packets PI according to the order in which these voice packets are written into the memory. Specifically, the FIFO memory 203 constructs a voice packet queue. The number of queues thus constructed is one. The FIFO memory 203 is realized by means of a memory that has a sufficient capacity, e. g., a random access memory.

The packet reader 204 inputs signals to which decoding period T has been applied from the period generator 208. Then, the packet reader 204 reads out one voice packet from the FIFO memory 203 for each decoding period T. The voice packets thus read out are output to the read-out processor 205. Furthermore, the packet reader 204 outputs a read-out signal E3 to the subtractor 207 each time that the packet reader 204 performs read-out from the FIFO memory 203. In cases where no voice packets are stored in the FIFO memory 203, the packet reader 204 outputs invalid data constructed from a specified bit pattern to the read-out processor 205 for each decoding period T.

The read-out processor 205 successively receives voice packets or invalid data from the packet reader 204. Furthermore, when the read-out processor 205 receives a voice packet, the read-out processor 205 sends this voice packet to the voice decoding circuit 102 "as is". On the other hand, when the read-out processor 205 receives invalid data, the read-out processor 205 outputs insertion signals E4 and E5, and also receives a substitute voice packet PP. The substitute voice packet PP is a voice packet which stores specified voice data corresponding to micro-noise or the like. This packed PP is sent to the voice decoding circuit 102 instead of invalid data. Accordingly, a voice packet PI or substitute voice packet PP is output from the read-out processor 205 as a packet PO for each decoding period T. As a result of the insertion of a substitute voice packet PP, voice information S in which factors that cause an unpleasant sensation to human beings such as voice interruptions or the like are ameliorated, i. e., voice information S with a high communications quality, can be produced by the voice decoding circuit 102.

The reception state detector 206 outputs a drop-out number D, insertion number I and cumulative number B for each monitoring period TE. The monitoring period TE is the period with which the communications quality is monitored. This monitoring period TE is set as an integral multiple of the decoding period T. The drop-out number D is the number of dropped-out voice packets detected by the drop-out detector 201. The reception state detector 206 judges the drop-out number D by counting the number of times that a signal E1 is received from the drop-out detector 201. The insertion number I is the number of substitute voice packets PP inserted into the voice packet sequence by the read-out processor 205. The reception state detector 206 judges the insertion number I by counting the number of times that a signal E4 is received from the read-out processor 205. The cumulative number B is the number of voice packets that have stored in the FIFO memory 203, i. e., the queue length. The reception state detector 206 receives the cumulative number B from the subtractor 207. After these values D, I and B have been output, the counters that count the values D and I are reset.

The subtractor 207 inputs the signals E2 and E3. Furthermore, the subtractor 207 calculates the cumulative number B using these signals E2 and E3, and outputs this cumulative number B to the reception state detector 206. The intervals at which the voice packets are received are long in some cases and short in other cases. For example, if the delay of a certain voice packet is small and the delay of the next voice packet is large, the reception interval is lengthened. Conversely, if the delay of a certain voice packet is large and the delay of the next voice packet is small, the reception interval is shortened. In both cases, the read-out processor 205 attempts to read out the voice packets with a fixed period T. Accordingly, if a state in which the time interval of voice packet reception is small continues, the number of voice packets stored in the FIFO memory 203 (i. e., the queue length) is increased; on the other hand, if a state in which the time interval of voice packet reception is large continues, the number of voice packets stored in the FIFO memory 203 decreases. For example, the calculation of the cumulative number B can be accomplished using two counters and one subtraction device. One of the counters counts the number of signals E2 input into the subtractor 207. The other counter counts the number of signals E3 input into the subtractor 207. Furthermore, the subtraction device subtracts the count value of the second counter from the count value of the first counter for each monitoring period TE. The result of this subtraction is the cumulative number B.

The period generator 208 generates a signal that determines the decoding period T and a signal that determines the monitoring period TE, and outputs these signals.

The substitute data generator 209 outputs one of the above-mentioned substitute voice packets PP each time that a signal E5 is input from the read-out processor 205.

Next, the communications quality judgement circuit 103 will be described in detail.

As was described above, the communications quality judgement circuit 103 calculates the communications quality index E for each monitoring period TE using the drop-out number D, the insertion number I and the cumulative number B input from the voice packet adjustment circuit 101.

The drop-out of voice packets PI naturally causes a deterioration in the quality of the voice information S. Furthermore, although the quality of the voice information S is improved by the insertion of substitute voice packets PP as described above, the communications quality in cases where packets PP are inserted is worse than the quality obtained in cases where there is no need for such insertion. Furthermore, the cumulative number B indicates the degree to which the reproduction of voice information transmitted from the packet transmitting device is delayed. Accordingly, the communications quality becomes poorer as the drop-out number D, the insertion number I and the cumulative number B increase.

In the present embodiment, the communications quality index E is obtained by calculation using Equation (1) shown below. However, in cases where E<0, E is set equal to zero. In Equation (1), N is the ratio of the monitoring period TE to the decoding period T, i. e., TE/T. As was described above, the monitoring period TE is set as an integral multiple of the decoding period T. Accordingly, N is a positive integer. Furthermore, the values of $\alpha$, $\beta$ and $\gamma$ can be arbitrarily determined. For example, in cases where the effects of drop-out of voice packets and insertion of substitute voice packets PP on the voice quality is large, and the effect of the queue length on the voice quality is small, α and β are set at large values, and γ is set at a small value. For instance, these values can be set as α=10, β=10 and γ=2.

$$[E]=5-I\times(\alpha/N)-D\times(\beta/N)-B\times T\times\gamma \quad (1)$$

In cases where the communications quality is in an ideal state, i. e., in cases where D, I and B are zero, the value of the index E is 5. On the other hand, in cases where the communications quality is at the poorest level, the value of the index E is zero.

Next, the overall operation of the communications device 100 of the present embodiment will be described with reference to FIG. 3.

Figure 3:
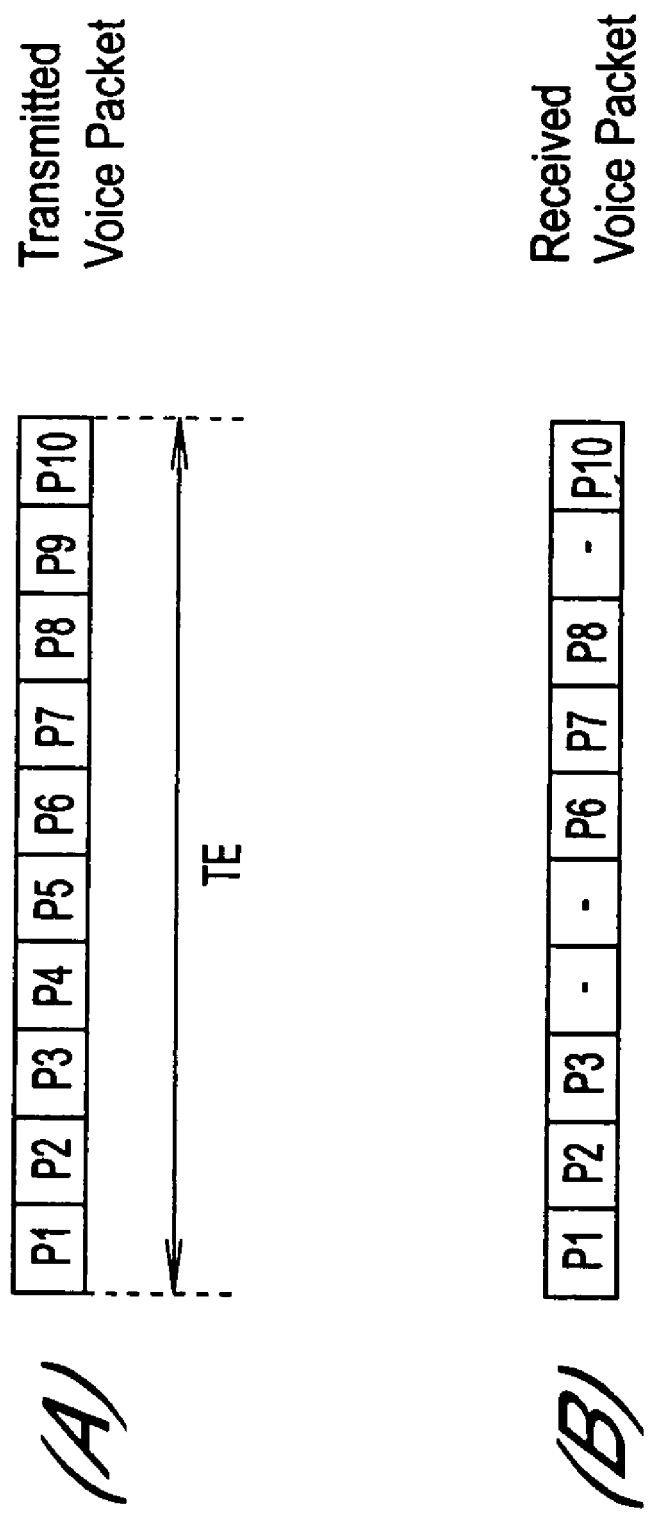
FIG. 3 is a schematic diagram which is used to illustrate the operation of the voice packet communications system of the first embodiment.

Below, FIG. 3(A) shows (in schematic form) a sequence of voice packets P1 through P10 transmitted by the packet transmitting device within the monitoring period TE. FIG. 3(B) shows (in schematic form) the sequence of voice packets received by the packet receiving device within the monitoring period TE. Specifically, in the example shown in (A) and (B) of FIGS. 3, the voice packets P4, P5 and P9 have dropped out in the network. Below, the overall operation of the communications device 100 will be described using a case in which the voice packets P4, P5 and P9 have dropped out, and in which no voice packet delay has been generated, as an example.

The packet transmitting device successively transmits the voice packets P1 through P10 to the packet receiving device. The voice packets P1 through P10 received by the packet receiving device are sent to the drop-out detector 201 installed in the voice packet adjustment circuit 101 inside the communications device 100.

When the drop-out detector 201 receives the voice packet P1, the drop-out detector 201 reads out the serial number, time stamp or the like that is stored in this voice packet P1, and stores this serial number or time stamp internally. Furthermore, the drop-out detector 201 sends the voice packet P1 to the packet writer 202. In this case, the drop-out detector 201 does not output a signal E1. The packet writer 202 writes the voice packet P1 into the FIFO memory 203, and also outputs a signal E2. The subtractor 207 increases the count value of the signals E2 by "1". The packet reader 204 reads out the voice packet P1 at a timing given by the signal T. Generally, the speed with which the voice decoding circuit 102 decodes the voice packets is set so that this speed coincides with the speed at which the packet transmitting device produces and outputs the voice packets. Accordingly, the period with which the packet reader 204 reads out the voice packets is also set so that this period corresponds to the decoding speed of the voice decoding circuit 102. Accordingly, the decoding period [T], i. e., the read-out period of the packet reader 204, is set so that T=TE/10. The packet reader 204 sends the voice packet P1 that has been read out to the read-out processor 205, and also outputs a signal E3. The subtractor 207 increases the count value of the signals E3 by "1". the read-out processor 205 outputs the voice packet P1 to the voice decoding circuit 102 as a packet PO without outputting signals E4 or E5.

After time T has elapsed following the reception of the voice packet P1, the drop-out detector 201 receives the voice packet P2. The drop-out detector 201 reads the serial number or the like that is stored in this voice packet P2, and judges whether or not drop-out has occurred. In this case, since no drop-out has occurred, a signal E1 is not output. Subsequently, the voice packet P2 is sent to the packet writer 202. The packet writer 202 writes this voice packet P2 into the FIFO memory 203, and also outputs a signal E2. The subtractor 207 increases the count value of the signals E2 by "1". The packet reader 204 reads out the voice packet P2, sends the read-out voice packet P2 to the read-out processor 205, and outputs a signal E3. The subtractor 207 increases the count value of the signals E3 by "1". The read-out processor 205 then outputs the voice packet P2 to the voice decoding circuit 102 as a packet P0 without outputting signals E4 or E5.

When the voice packet P3 is received, the drop-out detector 201, packet writer 202, FIFO memory 203, packet reader 204, read-out processor 205 and subtractor 207 perform the same operations as when the voice packet P2 was received.

After time T has elapsed following the reception of the voice packet P3, the drop-out detector 201 does not receive the next voice packet. The reason for this is that the voice packet P4 has dropped out in the network. Accordingly, the packet writer 202 does not write a voice packet or output a signal E2. However, as was described above, the packet reader 204 attempts to read out a voice packet from the FIFO memory 203 when a signal T is input. In this case, no voice packet is stored in the FIFO memory 203; accordingly, the packet reader 204 sends invalid data to the read-out processor 205. The read-out processor 205 outputs signals E4 and E5, receives a substitute voice packet PP, and then outputs this substitute voice packet PP as a voice packet PO. The reception state detector 206 increases the count value of the signals E4 by "1".

The voice packet P5 has also dropped out in the network. Accordingly, when the next signal T is input, the packet reader 204 attempts to read out a voice packet from the FIFO memory 203. In this case, no voice packet is stored in the FIFO memory 203; accordingly, the packet reader 204 again sends invalid data to the read-out processor 205. The read-out processor 205 outputs signals E4 and E5, receives a substitute voice packet PP, and outputs this substitute voice packet PP as a voice packet PO. The reception state detector 206 increases the count value of the signals E4 by "1".

Subsequently, the drop-out detector 201 receives the voice packet P6. The drop-out detector 201 reads out the serial number of the like that is stored in this voice packet P5. Then, the drop-out detector 201 recognizes that the two voice packets P4 and P5 have dropped out, and outputs two signals E1. The reception state detector 206 increases the drop-out count value D by "2". Afterward, the voice packet P6 is sent to the packet writer 202. The packet writer 202 writes this voice packet P6 into the FIFO memory 203, and outputs a signal E2. The subtractor 207 increases the count value of the signals E2 by "1". The packet reader 204 reads out the voice packet P6 from the FIFO memory 203, sends the read-out voice packet P6 to the read-out processor 205, and outputs a signal E3. The subtractor 207 increases the count value of the signals E3 by "1". The read-out processor 205 then outputs the voice packet P6 to the voice decoding circuit 102 as a packet PO without outputting signals E4 or E5.

When the voice packets P7 and P8 are received, the drop-out detector 201, packet writer 202, FIFO memory 203, packet reader 204, read-out processor 205 and subtractor 207 perform the same operations as when the voice packets P1 through P3 were received.

When then next signal T is input, the packet reader 204 attempts to read out a voice packet from the FIFO memory 203. However, since the voice packet P9 has dropped out in the network, no voice packet is stored in the FIFO memory 203. Accordingly, the packet reader 204 sends invalid data to the read-out processor 205. The read-out processor 205 outputs signals E4 and E5, receives a substitute voice packet PP, and outputs this substitute voice packet PP as a voice packet PO. The reception state detector 206 increases the count value of signals E4 by "1".

Next, the drop-out detector 201 receives the voice packet P10. The drop-out detector 201 reads out the serial number or the like that is stored in this voice packet P10. Then, the drop-out detector 201 recognizes that the voice packet P9 has dropped out, and outputs one signal E1. The reception state detector 206 increases the drop-out count value D by "1". Subsequently, the voice packet P10 is sent to the packet writer 202. The packet writer 202 writes this voice packet P10 into the FIFO memory 203, and outputs a signal E2. The subtractor 207 increases the count value of the signals E2 by "1". The packet reader 204 reads out the reads out the voice packet P10 from the FIFO memory 203, sends the read-out voice packet P10 to the read-out processor 205, and outputs a signal E3. The subtractor 207 increases the count value of the signals E3 by "1". The read-out processor 205 outputs the voice packet P10 to the voice decoding circuit 102 as a packet PO without outputting a signal E4 or E5.

When the monitoring period TE elapses, the subtractor 207 sends the difference between the count value of the signals E2 and the count value of the signals E3, i. e., the cumulative number B, to the reception state detector 206. The reception state detector 206 sends the drop-out number D, the insertion number I and the cumulative number B to the communications quality judgement circuit 103. As will be seen from the abovementioned description, the drop-out number D and insertion number I are both "3". Furthermore, since there is no voice packet delay in this example of operation, the cumulative number B is "0".

The communications quality judgement circuit 103 substitutes these values D, I and B into the abovementioned Equation (1), and calculates the communications quality index E. Furthermore, in this example of operation, N is 10. Accordingly, assuming that $\alpha=10$, $\beta=10$, $\gamma=2$ and $T=0.01$, then the calculation result of Equation (1) is "−1". As was described above, in cases where the calculation result is a negative value, the communications quality index E is replaced by "0". As a result, it is seen that in cases where 30 percent of the voice data is lost, the communications quality is in an extremely poor state even if there is no delay.

For example, in a case where 10 percent of the voice data is lost and there is no delay, the communications quality index E is 3.

In this description of the operation, it was assumed that there was no delay. In cases where there is no delay, a state in which no voice packet is stored in the FIFO memory 203 when the packet reader 204 attempts to read out a voice packet is caused only by the drop-out of voice packets. Accordingly, the drop-out number D and the insertion number I are the same. On the other hand, in cases where a delay is generated in the network, the drop-out number D and insertion number I no longer coincide. As was described above, a fluctuation in the delay, i. e., jitter, causes a variation in the queue length of the FIFO memory 203. In cases where the queue length is zero, a state in which the packet reader 204 cannot read out a voice packet is generated not only by voice packet drop-out, but also by delay. On the other hand, in cases where the queue length is "2" or greater, there may be cases in which a state in which the packet reader 204 cannot read out a voice packet is not generated even if voice packet drop-out should occur.

As was described above, the communications device 100 of the present embodiment can output, automatically and in real time, a communications quality index E that objectively expressed in the communications quality. The communications device 100 of the present embodiment is useful in the development and operation of voice communications systems such as internet telephony and the like.

When a voice communications system is to be developed, the developer must repeatedly evaluate the communications quality and modify the system. Accordingly, a technique which outputs a communications quality index E automatically and in real time greatly reduces the development time and development cost.

In cases where a voice communications system is operated, an improvement in communications quality may be expected as a result of the use of the technique of the present invention. Specifically, a constant communications quality can be guaranteed by monitoring the communications quality in real time, and automatically switching the network path in cases where the communications quality is poor.

Second Embodiment

A second embodiment of the present invention will be described below.

Figure 4:
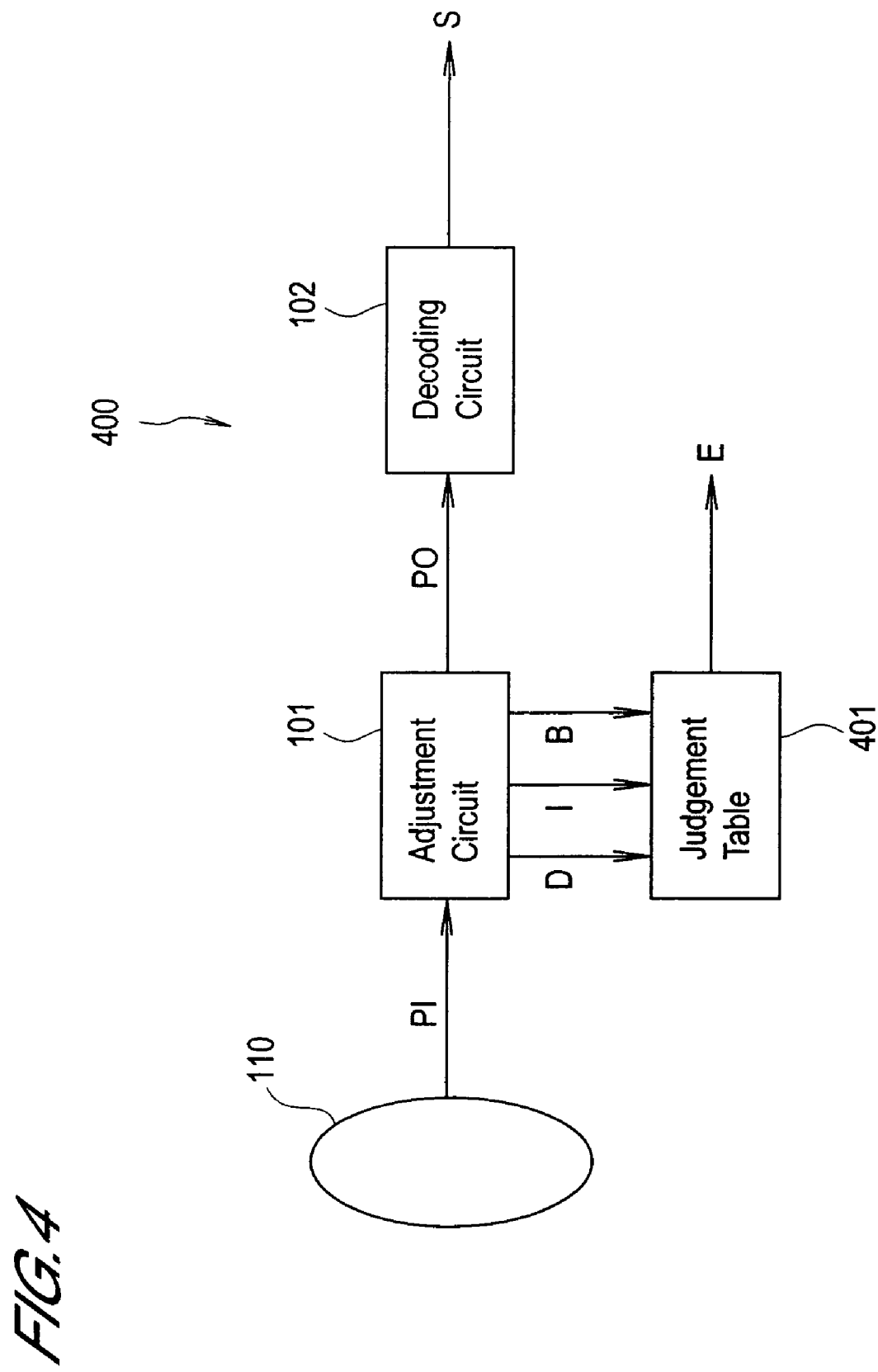
FIG. 4 is a block diagram which illustrates the construction of essential parts of a voice packet communications system constituting a second embodiment of the present invention.

FIG. 4 is a block diagram which illustrates the construction of the communications device 400 of the present embodiment in schematic terms. In FIG. 4, symbols that are the same as in FIG. 1 indicate constituent elements that are the same as in FIG. 1.

The communications device 400 of the present embodiment has a communications quality judgement table 401 instead of a communications quality judgement circuit 103 in FIG. 1. For example, the communications quality judgement table 401 is realized by means of a non-volatile memory.

A communications quality index E is stored in the communications quality judgement table 401 for each combination of the parameters D, I and B. When the drop-out number D, the insertion number I and the cumulative number B are input from the voice packet adjustment circuit 101, the communications quality judgement table 401 outputs the stored value corresponding to the combination of these values D, I and B as a communications quality index E. The communications quality index E can be expressed by the following Equation (2):

$$E=\text{TABLE }[I][B][D] \qquad (2)$$

In the abovementioned first embodiment, the communications quality index E was determined by calculation using Equation (1). However, in cases where it is desired to control the communications quality with a high degree of precision, it is not easy to obtain the index E by calculation. The reason for this is that a calculation formula that shows a high degree of coincidence with the human auditory sense is required. Especially in cases where a linear function such as Equation (1) is used, it would appear difficult to achieve a highly precise matching between a quality judgement based on the human auditory sense and the calculated results, i. e., the index E.

In the present embodiment, the communications quality index E is determined using the abovementioned communications quality judgement table 401 instead of a calculation formula. Accordingly, even in cases where the index E is a nonlinear function with respect to the parameters D, I and B, an index E that shows a high degree of coincidence with the human auditory sense can be produced by means of a device with a simple structure.

Third Embodiment

Below, a third embodiment of the present invention will be described with reference to FIGS. 5 through 8.

Figure 5:
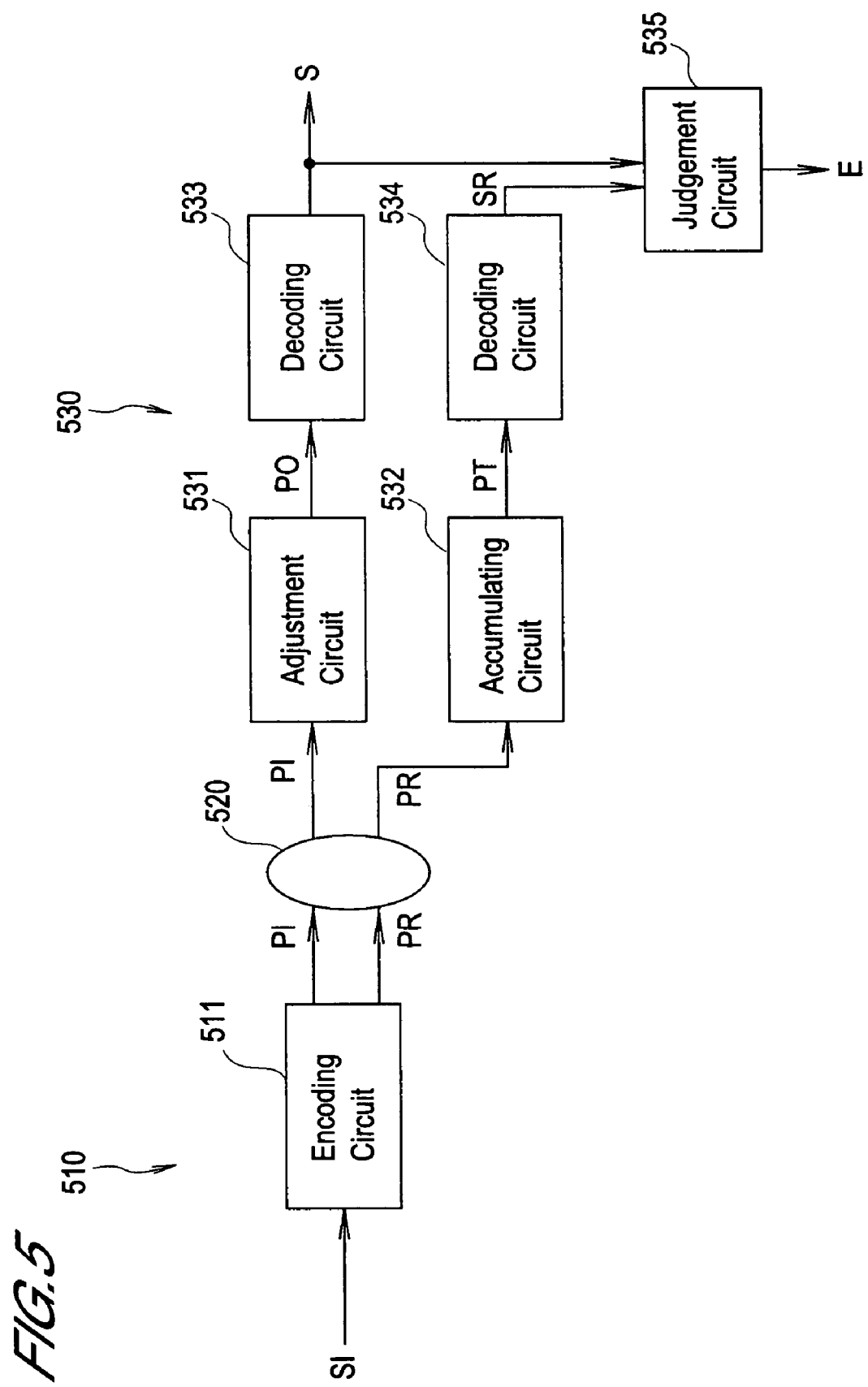
FIGS. 5, 6 and 7 are block diagrams which illustrate the construction of essential parts of a voice packet communications system constituting a third embodiment of the present invention.

FIG. 5 is a block diagram which illustrates the construction of the voice packet communications system of the present embodiment. As is shown in FIG. 5, this system 500 comprises a packet transmitting device 510, a network 520 and a packet receiving device 530.

The packet transmitting device 510 has a voice encoding circuit 511. The voice encoding circuit 511 inputs voice information SI from a preceding circuit, and outputs two types of voice packets PI and PR. Here, the voice packets PI are the same as the voice packets PI in the first and second embodiments. On the other hand, the voice packets PR are voice packets used for reference. Specifically, the voice packets PR are used to evaluate the communications quality of the voice packets PI. The voice encoding circuit 511 outputs these voice packets PI and PR to the network 520.

The network 520 forms a communications connection between the packet transmitting device 510 and the packet receiving device 530. Here, a protocol of the type in which quality is not guaranteed is used for the communication of the voice packets PI. On the other hand, a protocol of the type in which quality is guaranteed, i. e., TCP/IP, is used for the communication of the voice packets PR. In other words, the voice packets PR are transmitted in a communications environment in which there is very little possibility of the occurrence of delay or jitter.

The packet receiving device 530 receives the voice packets PI and PR from the network 520. Furthermore, the packet receiving device 530 performs encoding and quality evaluation of the voice packets PI. The packet receiving device 530 comprises a voice packet adjustment circuit 531, a voice packet accumulating circuit 532, a voice decoding circuit 533, a reference voice decoding circuit 534, and a communications quality judgement circuit 535.

Figure 6:
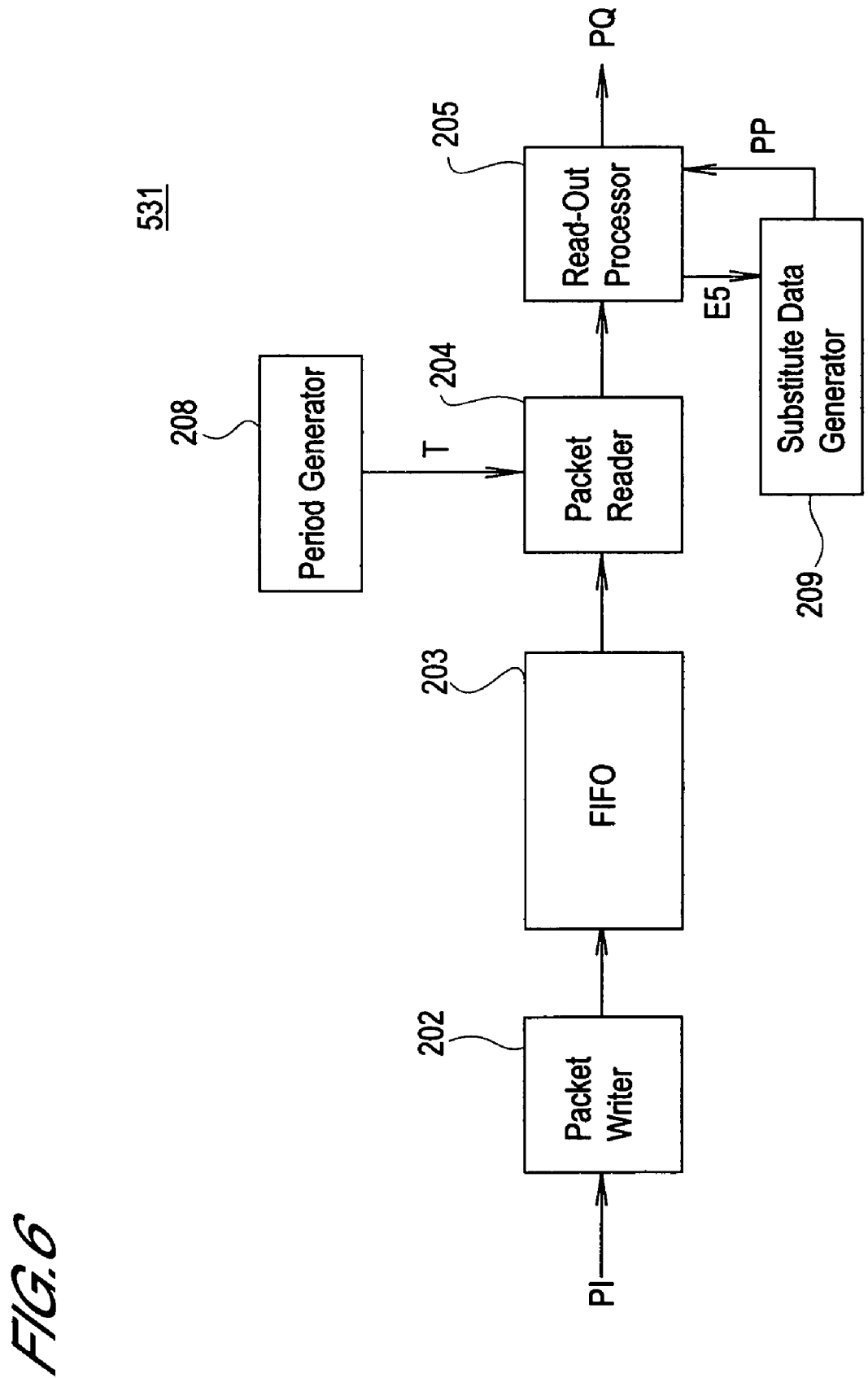

The voice packet adjustment circuit 531 receives voice packets PI from the network 520, and outputs a voice packet PO in each decoding period T. FIG. 6 shows one example of the internal structure of the voice packet adjustment circuit 531. In FIG. 6, constituent elements that are labeled with the same symbols as in FIG. 2 are respectively the same as the corresponding constituent elements in FIG. 2. The voice packet adjustment circuit 531 does not have any parts that are related to the communications quality function. Accordingly, the voice packet adjustment circuit 531 does not have a drop-out detector 201, reception state detector 206 or subtractor 207. Consequently, the packet writer 202 does not output any signal E2, the packet reader 204 does not output any signal E3, the read-out processor 205 does not output any signal E4, and the period generator 208 does not output any signal indicating the monitoring period TE.

Figure 7:
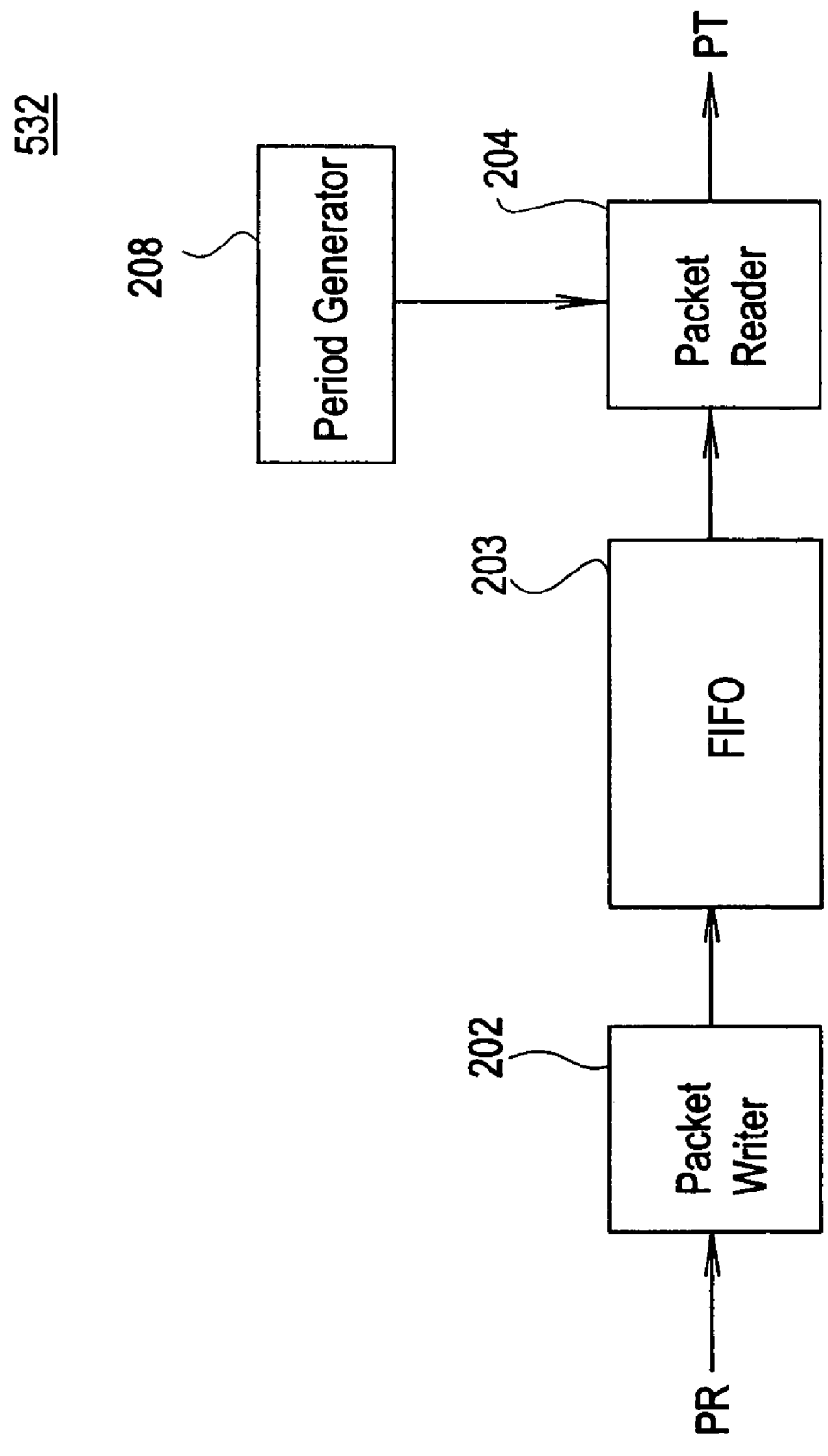

The voice packet accumulating circuit 532 receives voice packets PR from the network 520, and outputs voice packets PT. FIG. 7 shows one example of the internal structure of the voice packet accumulating circuit 532. In FIG. 7, constituent elements that are labeled with the same symbols as in FIG. 6 are respectively the same as the corresponding constituent elements in FIG. 6. The voice packets PT are not used in voice decoding; accordingly, the voice packet accumulating circuit 532 does not have a read-out processor 205 or substitute data generator 209.

The voice decoding circuit 533 receives voice packets PO from the voice packet adjustment circuit 531, and extracts and decodes the voice information stored in the voice packets PO. As a result, voice information S is produced. A circuit which is the same as the voice decoding circuit 102 in the first embodiment may be used as the voice decoding circuit 533.

The reference voice decoding circuit 534 receives voice packets PT from the voice packet accumulating circuit 532, and extracts and decodes the voice information stored in the voice packets PT. As a result, voice information SR is produced. A circuit which is the same as the voice decoding circuit 533 is used as the decoding circuit 534.

The communications quality judgement circuit 535 evaluates the quality of the voice information S. The voice information SR is referred to in this evaluation. The results of this evaluation are output as a communications quality index E in each standard period TS. For example, the ITU-T Standard P.861 can be used as the evaluation method. By using this standard, it is possible to perform a communications quality evaluation which shows precise agreement with human subjectivity.

Next, the operation of the system 500 of the present embodiment will be described.

Figure 8:
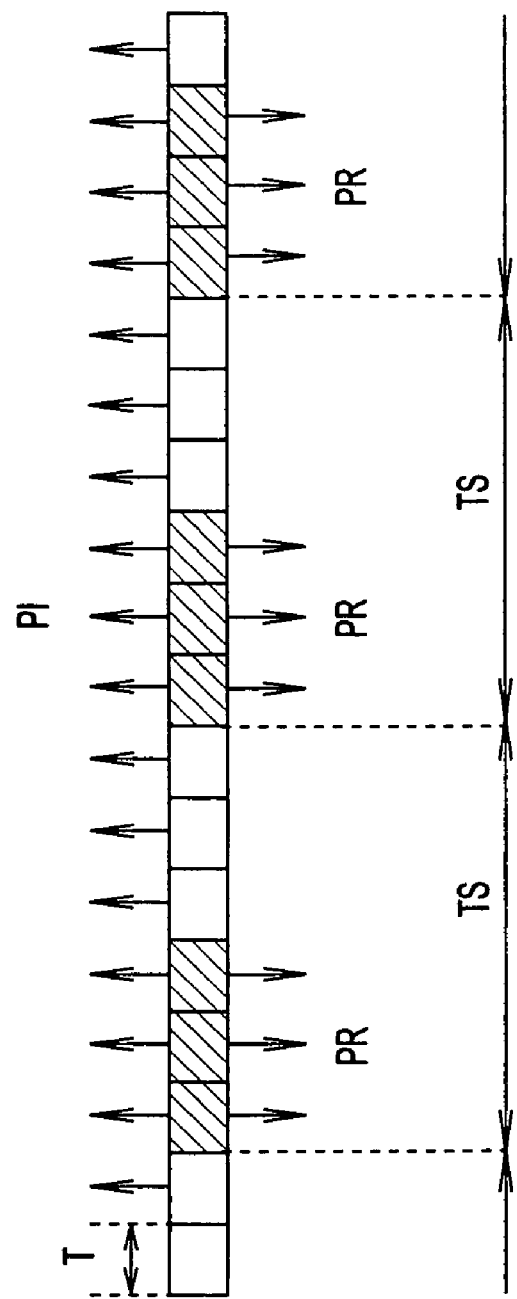
FIG. 8 is a schematic diagram which is used to illustrate the operation of the voice packet communications system of the third embodiment.

FIG. 8 is a schematic diagram which is used to illustrate the procedure that produces the voice packets PI and PR. As is shown in FIG. 8, the voice encoding circuit 511 successively produces voice packets PI in each period T. Furthermore, in each period TS, voice packets PR are produced by copying a specified number of voice packets PI. In the example shown in FIG. 8, the period TS is "6×T", and the specified number is "3".

As was described above, the voice packets PI are successively sent to the voice packet adjustment circuit 531 in accordance with a protocol of the type in which quality is not guaranteed. Furthermore, the voice packets PR are sent to the voice packet accumulating circuit 522 in accordance with a protocol of the type in which quality is guaranteed. In the example shown in FIG. 8, the voice packets PR are transmitted with the same timing as the corresponding voice packets PI. Specifically, in each period TS, three voice packets PR are successively transmitted in the initial time 3×T, and nothing is transmitted in the following time 3×T.

The voice packet adjustment circuit 531 receives the voice packets PI. As was described above, the communications protocol of the voice packets PI does not guarantee the quality. Accordingly, in most cases, the reception period of the voice packets PI does not agree with the decoding period T because of delay and jitter generated in the network 520. Furthermore, some of the voice packets PI drop out. The voice packet adjustment circuit 531 adjusts the period of the voice packets PI, and inserts substitute data if necessary. As a result, voice packets PO are produced.

The voice packet accumulating circuit 522 receives the voice packets PR. As was described above, the communications protocol of the voice packets PR guarantees the quality. Accordingly, in most cases, the difference between the reception period of the voice packets PR and the decoding period T is extremely small, and there is almost no drop-out of voice packets PR. The voice packet adjustment circuit 532 performs a fine adjustment of the period of the voice packets PR. The finely adjusted voice packets are output as voice packets PT.

The voice decoding circuit 533 extracts and decodes the voice information of the voice packets PO. As a result, voice information S is produced. The voice information S is output to the outside of the packet receiving device 530, and is sent to the communications quality judgement circuit 535.

The reference voice decoding circuit 534 extracts and decodes the voice information of the voice packets PT. As a result, voice information SR is produced. The voice information SR is sent to the communications quality judgement circuit 535, but is not output to the outside of the packet receiving device 530.

The communications quality judgement circuit 535 evaluates the quality of the voice information S using the voice information SR. The results of this evaluation are output as a communications quality index E in each standard period TS.

The communications system 500 of the present embodiment can output, automatically and in real time, a communications quality index E that objectively expresses the communications quality. Like the communications devices 100 of the first and second embodiments, the communications system 500 of the present embodiment is useful in the development and operation of voice communications systems such as internet telephony or the like.

In the communications system 500 of the present embodiment, it is also useful (for example) to use the voice packets PR only during maintenance or the like. Ordinarily, communications using a protocol of the type in which quality is guaranteed are more expensive than communications using a protocol of the type in which quality is not guaranteed. In cases where the voice packets PR are used only during maintenance, the communications cost is reduced.

In the communications system 500 of the present embodiment, there is no need to add serial numbers of the like to the voice packets PI; furthermore, there is no need to calculate the drop-out number D, insertion number I or cumulative number B. Accordingly, the packet transmitting device 510 and packet receiving device 530 can be made more compact.

Fourth Embodiment

Below, a fourth embodiment of the present invention will be described with reference to FIG. 9.

The present embodiment is an example of a system which has a function that evaluates the effect on communications quality of information drop-out that occurs when the compressed data become to be extracted.

Figure 9:
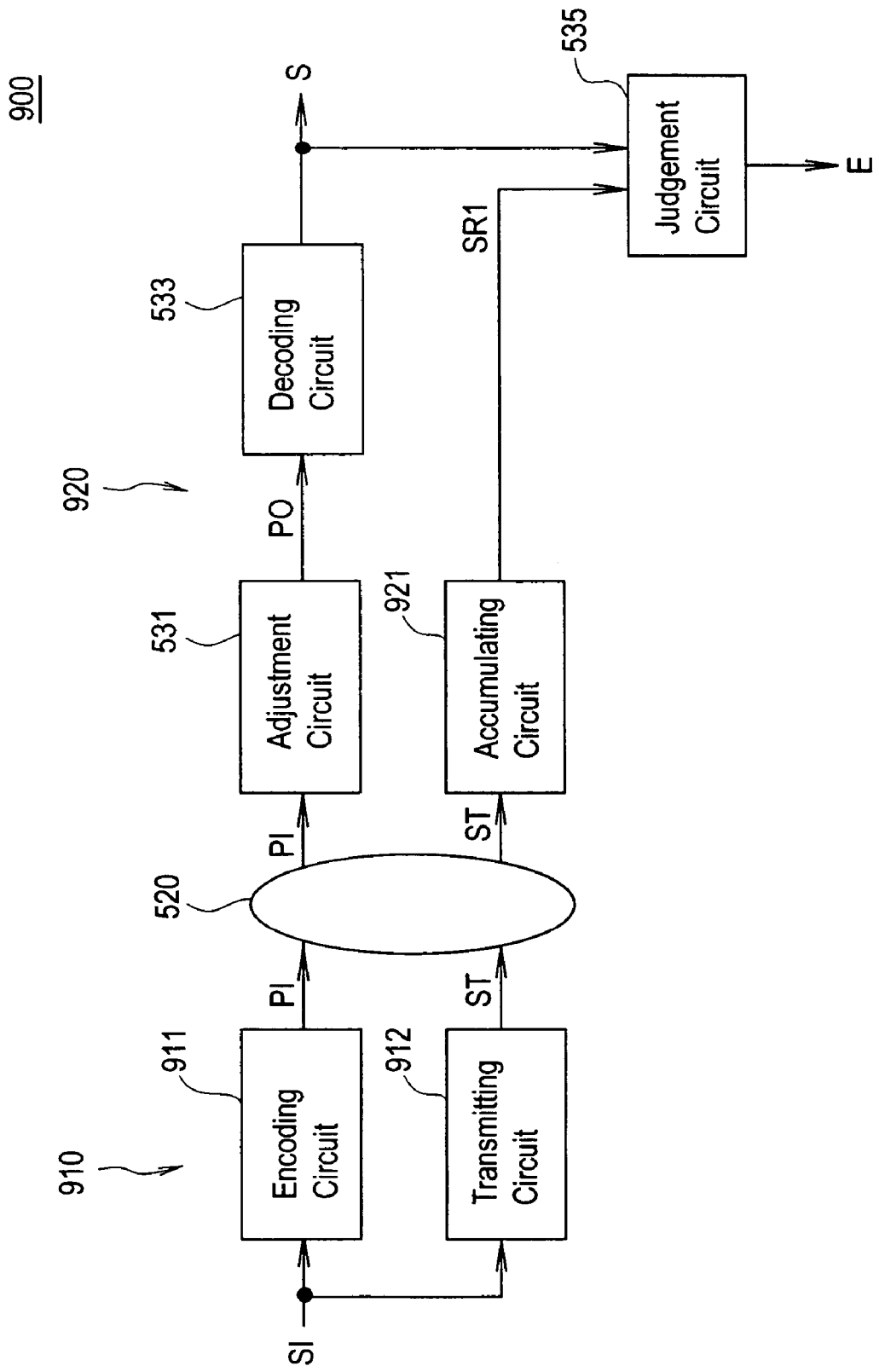
FIG. 9 is a block diagram which illustrates the construction of essential parts of a voice packet communications system constituting a fourth embodiment of the present invention.

FIG. 9 is a block diagram which illustrates the construction of the voice packet communications system 900 of the present embodiment. In FIG. 9, constituent elements that are labeled with the same symbols as in FIG. 5 are respectively the same as the corresponding constituent elements in FIG. 5.

The voice encoding circuit 911 compresses and encodes input voice information SI, and produces voice packets PI using the compressed and encoded voice information. The voice encoding circuit 911 differs from the voice encoding circuit 511 in FIG. 5 in that this voice encoding circuit 911 does not output reference voice packets PR. The voice encoding circuit 911 transmits one voice packet PI in each decoding period T. The voice packets PI are transmitted in accordance with a protocol of the type in which quality is not guaranteed.

The reference voice transmitting circuit 912 converts input voice information SI into voice packets ST without compressing and encoding the voice information. Since the voice packets ST are not compressed, these voice packets ST are output at a shorter period than the voice packets PI. Specifically, in a case where the compression rate of the voice data stored in the voice packets PI is n, the transmission period of the voice packets ST is T/n. The voice packets ST are transmitted in accordance with a protocol of the type in which quality is guaranteed.

The voice packet accumulating circuit 921 receives the voice packets ST. Furthermore, each time that a number of voice packets ST corresponding to the monitoring period TE has accumulated, the voice packet accumulating circuit 921 outputs the accumulated voice packets ST as voice information SR1.

Next, the overall operation of the system 900 of the present embodiment will be described.

As was described above, the voice encoding circuit 911 compresses and encodes the voice information SI, and converts this voice information SI into voice packets PI. On the other hand, the reference voice transmitting circuit 912 converts the voice information SI into voice packets ST without compressing or encoding this information. The packet transmitting device 910 outputs these packets SI and ST to the network 520.

The voice packets PI are received by the voice packet adjustment circuit 531. The voice packet adjustment circuit 531 adjusts the period of the voice packets PI, and inserts substitute data if necessary. As a result, voice packets PO are produced. The voice packets PO are input into the voice decoding circuit 533. The voice decoding circuit 533 extracts and decodes the voice information of the voice packets PO. As a result, voice information S is produced. The voice information S is output to the outside of the packet receiving device 530, and is sent to the communications quality judgement circuit 535.

The voice packets ST are received by the voice packet accumulating circuit 921. As was described above, the voice packet accumulating circuit 921 outputs reference voice information SR1 in each monitoring period TE. Since the voice packets ST are not compressed and encoded, there is no need for extracting and decoding of these voice packets. The voice information SRI is input "as is" into the communications quality judgement circuit 535.

The communications quality judgement circuit 535 evaluates the quality of the voice information S using the voice information SR1. The results of this evaluation are output as a communications quality index E in each monitoring period TE.

The system 900 of the present embodiment can evaluate the communications quality of the voice packets PI using voice information that is not subjected to compression and extracting. Accordingly, an evaluation of communications quality which takes into account the effect on communications quality of the information drop-out that occurs when compressed data become to be extracted can be performed.

The system 900 of the present embodiment can be utilized in the development, maintenance and the like of voice communications systems.

Fifth Embodiment

Below, a fifth embodiment of the present invention will be described with reference to FIGS. 10 through 14.

The present embodiment is another example of a system which has a function that evaluates the effect on communications quality of information drop-out that occurs when compressed data become to be extracted.

Figure 10:
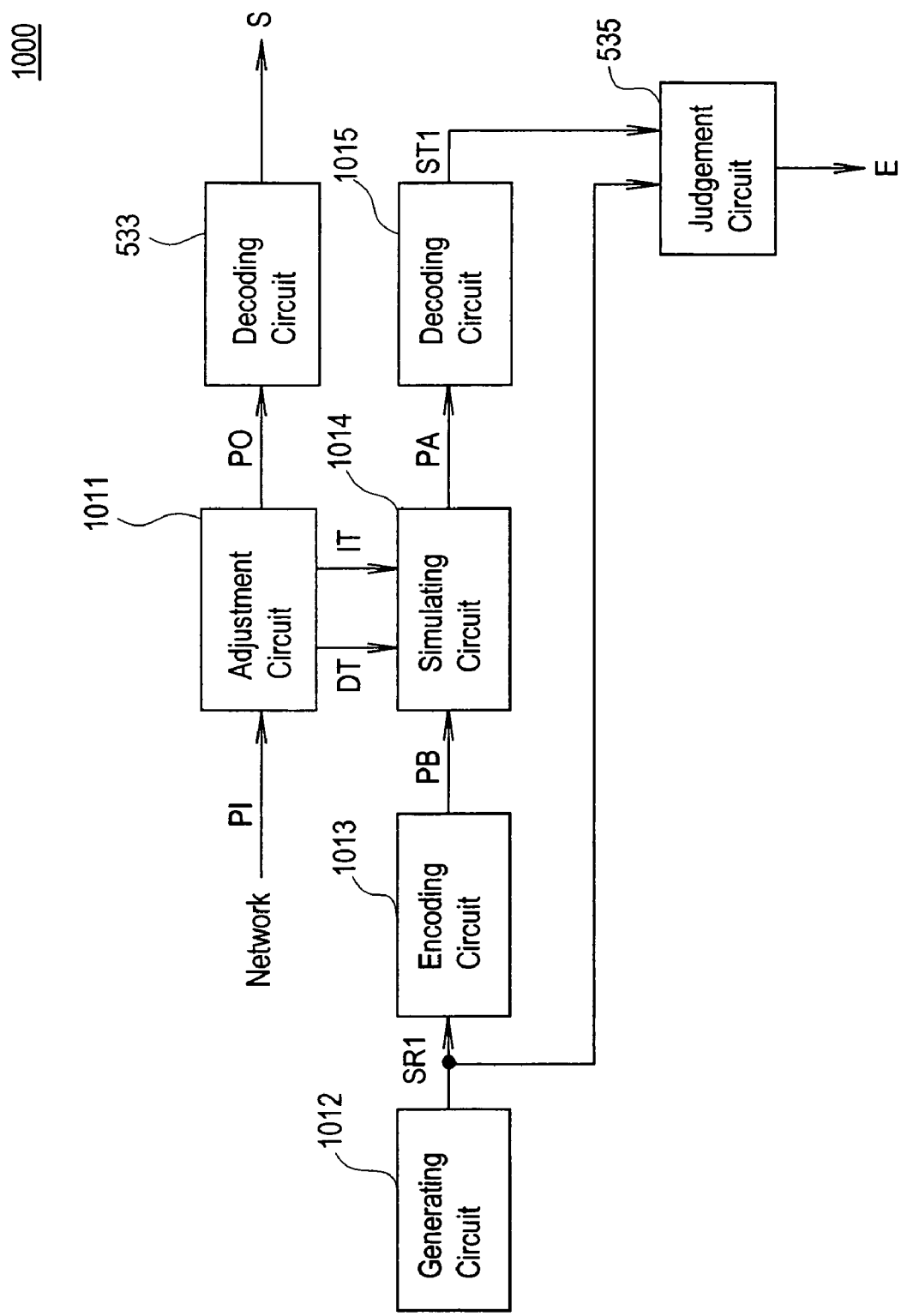
FIGS. 10 and 11 are block diagrams which illustrate the construction of essential parts of a voice packet communications system constituting a fifth embodiment of the present invention.

FIG. 10 is a block diagram which illustrates the construction of the voice packet communications device 1000 of the present embodiment. In FIG. 10, constituent elements that are labeled with the same symbols as in FIG. 5 respectively indicate constituent elements that are the same as in FIG. 5.

The voice packet communications device 1000 is installed inside a packet receiving device. In the present embodiment, there are no restrictions on the construction of the packet transmitting device.

The voice packet adjustment circuit 1011 adjusts the voice packets PI; i. e., this voice packet adjustment circuit 1011 detects drop-out, makes the period uniform, and inserts substitute packets, like the voice packet adjustment circuit 101 of the first embodiment. Furthermore, the voice packet adjustment circuit 1011 outputs voice packets P0 obtained by these adjustments. In addition, the voice packet adjustment circuit 1011 outputs drop-out pattern information IT and substitution pattern information DT. The details of this drop-out pattern information IT and substitution pattern information DT will be described later.

The reference voice generating circuit 1012 produces voice information SR1. The content of the voice information SR1 is arbitrary. The voice information SR1 is output to the reference voice encoding circuit 1013 and communications quality judgement circuit 535.

The reference voice encoding circuit 1013 compresses and encodes the voice information SR1, and further produces voice packet PB using this compressed and encoded voice information.

The network simulating circuit 1014 inputs the voice packets PB, the drop-out pattern information IT and the substitution pattern information DT. Furthermore, the network simulating circuit 1014 modifies the voice packets PB using the information IT and DT. Specifically, the voice packets PB are modified to voice packets PA that have the same drop-out pattern and same substitution pattern as the voice packets PI.

The reference voice decoding circuit 1015 produces voice information ST1 by extracting and decoding the voice packets PA. A circuit with the same structure as the voice decoding circuit 533 may be used as the reference voice decoding circuit 1015.

Figure 11:
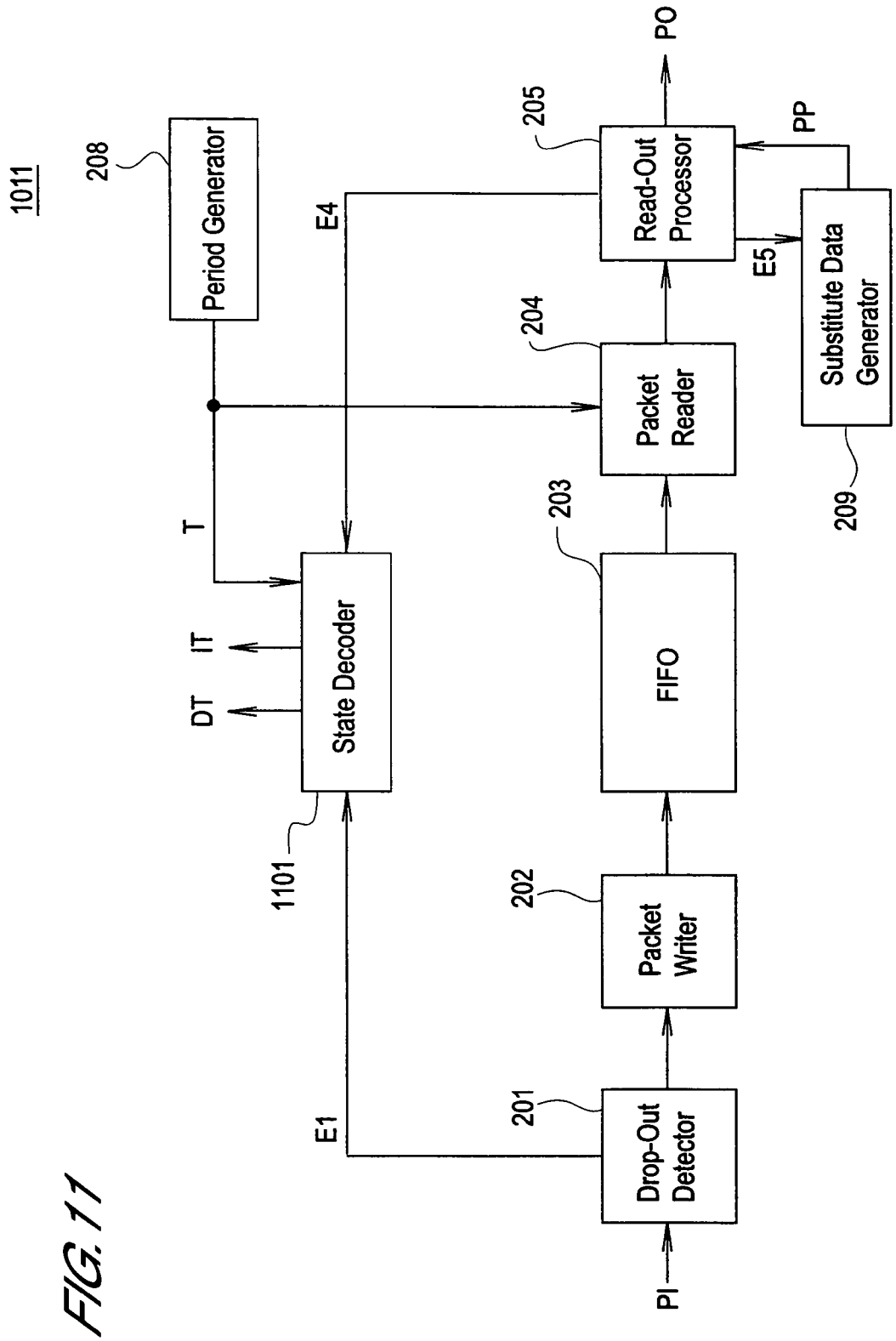

FIG. 11 shows one example of the internal structure of the voice packet adjustment circuit 1011. In FIG. 11, constituent elements labeled with the same symbols as in FIG. 2 respectively indicate constituent elements that are the same as in FIG. 2. As in FIG. 2, the voice packet adjustment circuit 1011 comprises a drop-out detector 201, packet writer 202, FIFO memory 203, packet reader 204, read-out processor 205, period generator 208 and substitute data generator 209. However, the packet writer 202 does not output any signal E2, the packet reader 204 does not output any signal E3, and the period generator 208 does not output any signal indicating the monitoring period TE. The reception state detector 1101 inputs a signal E1 from the drop-out detector 201, and inputs a signal E4 from the read-out processor 205, in each decoding period T. Furthermore, the reception state detector 1101 produces and outputs drop-out pattern information DT and substitute pattern information IT using these signals E1 and E4.

Figure 12:
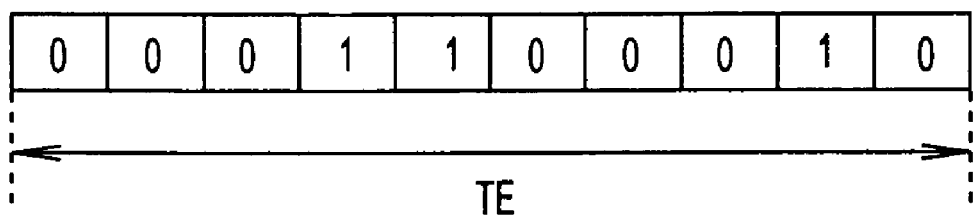

FIG. 12 is a schematic diagram which shows an example of the construction of the drop-out pattern information DT. FIG. 12 shows an example in which the drop-out pattern information DT is constructed from 10 bits of data. Below, the period of drop-out pattern information production, i. e., a period that is 10 times the decoding period T, will be referred to as the monitoring period TE. In FIG. 12, "1" indicates that a voice packet has dropped out, and "0" indicates that a voice packet has not dropped out. The information DT in FIG. 12 indicates that the fourth, fifth and ninth voice packets PI have dropped out.

Figure 13:
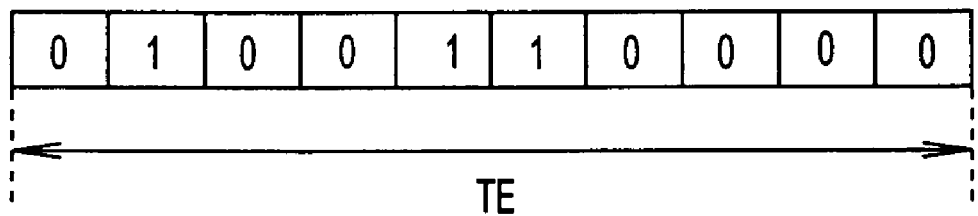

FIG. 13 is a schematic diagram which shows an example of the construction of the substitution pattern information IT. The number of bits of data in the substitution pattern information IT is the same as the number of bits of data in the drop-out pattern information DT. In FIG. 13, "0" indicates a received voice packet PI, and "1" indicates a substitute packet PP. The information IT in FIG. 13 indicates that the second, fifth and sixth voice packets are substitute packets PP.

Next, the overall operation of the communications device 1000 of the present embodiment will be described with reference to FIG. 14.

The voice packets PI are received by the voice packet adjustment circuit 1011. The voice packet adjustment circuit 1011 adjusts the period of the voice packets PI, and inserts substitute data if necessary. As a result, voice packets PO are produced. The voice packets PO are input into the voice decoding circuit 533. In addition, the voice packet adjustment circuit 1011 produces the drop-out pattern information DT and substitution pattern information IT shown in FIGS. 12 and 13, and outputs this information in each monitoring period TE. The difference in the detection timing of the drop-out pattern information DT and substitution pattern information IT is adjusted by the reception state detector 1101 inside the voice packet adjustment circuit 1011.

The voice decoding circuit 533 produces voice information S by extracting and decompressing the voice information of the voice packets PO. This voice information S is output to the outside of the packet receiving device. In the present embodiment, the voice information S is not used in the evaluation of the communications quality.

Reference voice information SR1 is output from the reference voice generating circuit 1012. This voice SR1 is converted into voice packets PB by the reference voice encoding circuit 1013.

The network simulating circuit 1014 first inputs 10 voice packets PB in each monitoring period TE. FIG. 14(A) shows these 10 voice packets in schematic form. In FIG. 14(A) the 10 voice packets PB are indicated by the symbols PI through P10. These voice packets PI through P10 are compared with the drop-out pattern information DT by the network simulating circuit 1014. FIG. 14(B) shows one example of the drop-out pattern information DT in schematic form. The network simulating circuit 1014 removes voice packets corresponding to the data "1" of the information DT from the voice packets P1 through P10. In the example shown in FIG. 14, the voice packets P4, P5 and P9 are removed. As a result, a voice packet sequence such as that shown in FIG. 14(C) is obtained.

Next, the network simulating circuit 1014 compares this voice packet sequence with the substitution pattern information IT. FIG. 14(D) shows one example of the substitution pattern information IT in schematic form. The network simulating circuit 1014 inserts substitute packets PP into the voice packet sequence in accordance with the substitution pattern information IT. In the example shown in FIG. 14(D), the second voice packet is a substitute packet PP. Accordingly, the network simulating circuit 1014 inserts a substitute packet PP as the second packet in the voice packet sequence (see FIG. 14(C)). As a result, a voice packet sequence such as that shown in FIG. 14(E) is obtained. Furthermore, in the example shown in FIG. 14(D) the fifth and sixth voice packets are substitute packets PP. Accordingly, the network simulating circuit 1014 inserts substitute packets PP as the fifth and sixth packets in the voice packet sequence. As a result, a voice packet sequence such as that shown in FIG. 14(F) is obtained.

The voice packets PA thus obtained are converted into voice information ST1 by the reference voice decoding circuit 1015.

The communications quality judgement circuit 535 evaluates the voice quality by comparing the voice information SR1 and ST1. The results of this evaluated are output from the communications quality judgement circuit 535 as an index E which indicates the quality of the voice information S.

As was described above, the device 1000 of the present embodiment makes it possible to evaluate the communications quality while taking into account the effect on communications quality of information drop-out that occurs when compressed data become to be extracted, without any need to transmit uncompressed data via the network 520.

In the device 1000 of the present embodiment, drop-out pattern information DT and substitution pattern information IT are produced in each monitoring period TE. However, it would also be possible to construct the device 1000 so that data indicating a packet drop-out and data indicating the insertion of a substitute packet are respectively sent to the network simulating circuit 1014 from the voice packet adjustment circuit 1011 one bit at a time.

Sixth Embodiment

A sixth embodiment of the present invention will be described with reference to FIG. 15.

Figure 15:
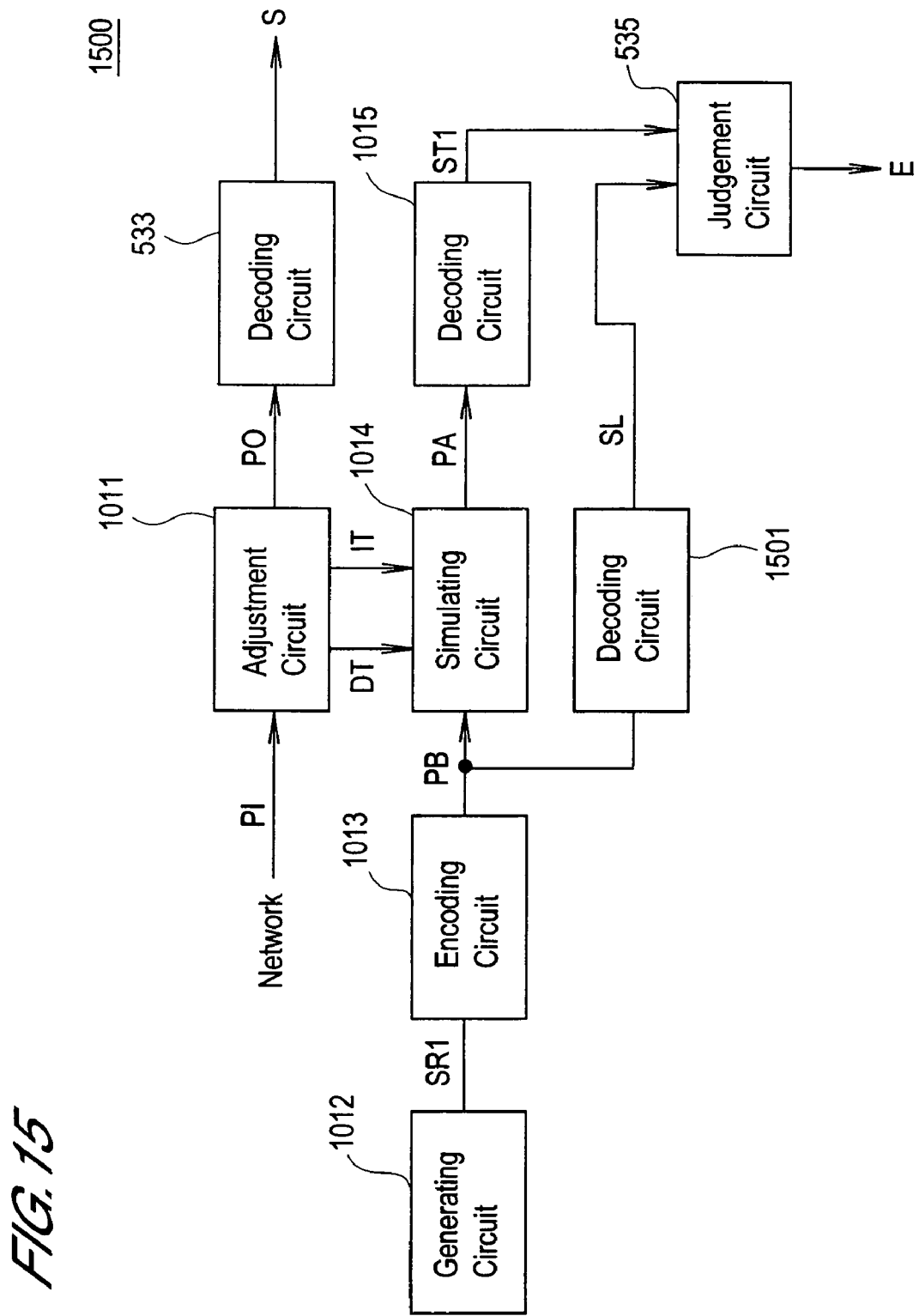
FIG. 15 is a block diagram which illustrates the construction of essential parts of a voice packet communications system constituting a sixth embodiment of the present invention.

FIG. 15 is a block diagram which illustrates the construction of the voice packet communications device 1500 of the present embodiment. In FIG. 15, constituent elements that are labeled with the same symbols as in FIG. 10 respectively indicate constituent elements that are the same as in FIG. 10.

The voice packet communications device 1500 has a normal voice decoding circuit 1501. The normal voice decoding circuit 1501 produces voice information SL by decoding voice packets PB. This voice information SL is sent to the communications quality judgement circuit 535. A circuit which has the same construction as the voice decoding circuit 533 or 1015 may be used as the normal voice decoding circuit 1501.

The overall operation of the communications device 1500 of the present embodiment will be described below.

As in the fifth embodiment, the voice packet adjustment circuit 1011 adjusts the period of the voice packets PI, and inserts substitute data if necessary. As a result, voice packets PO are produced. In addition, the voice packet adjustment circuit 1011 produces the drop-out pattern information DT and substitution pattern information IT shown in FIGS. 12 and 13, and outputs this information in each monitoring period TE.

The voice decoding circuit 533 produces voice information S by extracting and decoding the voice information of the voice packets PO. This voice information S is output to the outside of the packet receiving device.

Reference voice information SR1 is output from the reference voice generating circuit 1012. This voice ER1 is converted into voice packets PB by the reference voice encoding circuit 1013. The voice packets PB are sent to the network simulating circuit 1014 and normal voice decoding circuit 1501.

As in the fifth embodiment, the network simulating circuit 1014 modifies the voice packets PB into voice packets PA that have the same drop-out pattern and same substitution pattern as the voice packets PI. The voice packets PA are converted into voice information ST1 by the reference voice decoding circuit 1015.

The normal voice decoding circuit 1501 produces voice information SL by decoding the voice packets PB.

The communications quality judgement circuit 535 evaluates the telecommunication quality by comparing the voice information SR1 and SL. The results of this evaluation are output from the communications quality judgement circuit 535 as an index E which indicates the quality of the voice information S.

The communications system 1500 of the present embodiment can output, automatically and in real time, a communications quality index E that objectively expresses the communications quality. The communications system 1500 of the present embodiment is useful in the development, operation, maintenance and the like of voice communications systems.

The device 1500 of the present embodiment can operate without transmitting uncompressed data via the network 520. Accordingly, the communications quality index E can be obtained at a low cost.

Seventh Embodiment

A seventh embodiment of the present invention will be described with reference to FIG. 16.

The present embodiment differs from the abovementioned embodiments in that the packet transmitting device evaluates the communications quality of the voice packets.

Figure 16:
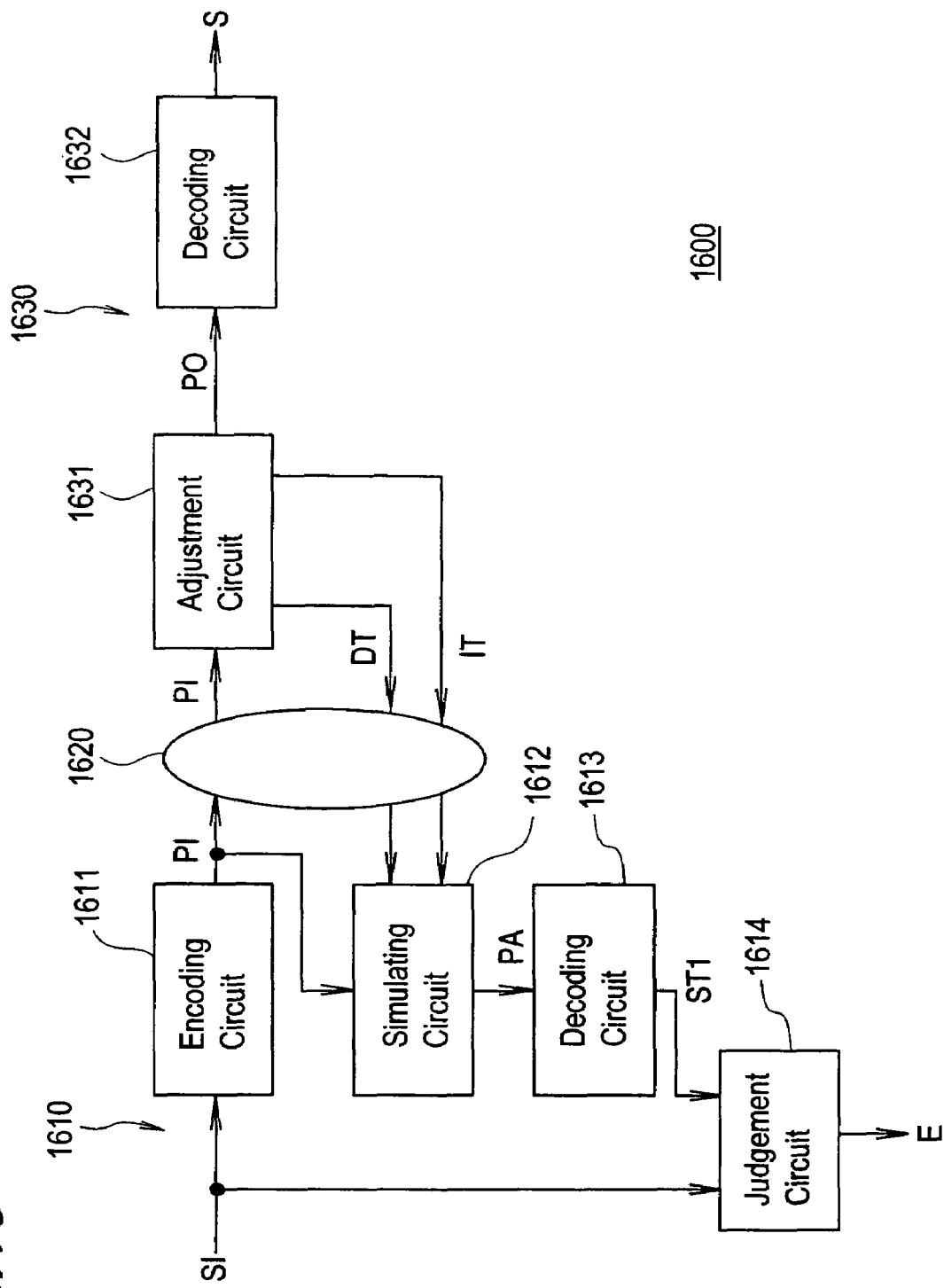
FIG. 16 is a block diagram which illustrates the construction of essential parts of a voice packet communications system constituting a seventh embodiment of the present invention.

FIG. 16 is a block diagram which illustrates the construction of the voice packet communications system 1600 of the present embodiment. As is shown in FIG. 16, this system 1600 comprises a packet transmitting device 1610, a network 1620 and a packet receiving device 1630.

The packet transmitting device 1610 comprises a voice encoding circuit 1611, a network simulating circuit 1612, a local voice decoding circuit 1613 and a communications quality judgement circuit 1614.

The voice encoding circuit 1611 compresses and encodes input voice information SI, and produces voice packets PI using this compressed and encoded voice information. The voice encoding circuit 1611 transmits one voice packet PI in each decoding period T.

The network simulating circuit 1612 inputs the voice packets PI, drop-out pattern information IT (see FIG. 12) and substitution pattern information DT (see FIG. 13). The drop-out pattern information IT and substitution pattern information DT are transmitted to the packet transmitting device 1610 form the packet receiving device 1630 using a packet communications technique. The network simulating circuit 1612 modifies the voice packets PI into voice packets PA using the information IT and DT.

The local voice decoding circuit 1613 produces voice information ST1 by decoding the voice packets PA. This voice information ST1 is sent to the communications quality judgement circuit 1614. A circuit which has the same construction as the communications quality judgement circuit 1614 may be used as the local voice decoding circuit 1613.

The communications quality judgement circuit 1614 evaluates the quality of the voice information SI using the voice information ST1, Like the communications quality judgement circuit 535 (see FIG. 5).

The packet receiving device 1630 comprises a voice packet adjustment circuit 1631 and a voice decoding circuit 1632.

The voice packet adjustment circuit 1631 adjusts the voice packets PI; i. e., this circuit 1631 detects drop-out, makes the period uniform, and inserts substitute packets. Furthermore, the voice packet adjustment circuit 1631 outputs voice packets PO obtained by these adjustments. In addition, the voice packet adjustment circuit 1631 transmits drop-out pattern information IT and substitution pattern information DT using a packet communications technique.

The voice decoding circuit 1632 produces voice information S by extracting and decoding the voice packets PA.

The overall operation of the communications device 1500 of the present embodiment will be described below.

First, voice packets PI are output to the network 1620 and network simulating circuit 1612 from the voice encoding circuit 1611. The voice packets PI being output to the network 1620 are received by the voice packet adjustment circuit 1631. The voice packet adjustment circuit 1631 adjusts the period of the voice packets PI, and inserts substitute data if necessary. As a result, voice packets PO are produced. In addition the voice packet adjustment circuit 1011 produces drop-out pattern information DT and substitution pattern information IT, forms this information into packets, and outputs these packets. The information DT and IT is sent to the network simulating circuit 1612 via the network 1620. The voice decoding circuit 1632 produces voice information S by extracting and decoding the voice information of the voice packets PO. The voice information S is output to the outside of the packet receiving device 1630.

The network simulating circuit 1612 modifies the voice packets PI using the information DT and IT received from the network 1620. The method of modification is that same as in the fifth embodiment (see FIG. 14). The voice packets PA obtained as a result of this modification are converted into voice information ST1 by the local voice decoding circuit 1613. The communications quality judgement circuit 1614 evaluates the voice quality by comparing the voice information SI and the voice information ST1. The results of this evaluation are output from the communications quality judgement circuit 1614 as a voice quality index E.

In cases where bi-directional communications are performed via a network 1620 such as the internet or the like, the same route, and therefore the same router, is used for communications via the outbound and return paths. Accordingly, in cases where packet drop-out and delay occur as a result of the processing capacity of the switches in the router, the communications quality on the outbound path and the communications quality on the return path are the same. As was described above, an ordinary voice packet communications device is equipped with both a packet transmitting device and a packet receiving device. Accordingly, in cases where the communications quality on the outbound path and the communications quality on the return path are the same, there is no need of the packet transmitting device to evaluate the communications quality. However, in cases where packet drop-out and delay occur as a result of the processing capacity of the ports in the router, the communications quality on the outbound path and the communications quality on the return path are not necessarily the same. The reason for this is that the ports used for the outbound path and the ports used for the return path are different. In the present embodiment, in cases where the communications quality on the outbound path and the communications quality on the return path are different, the packet transmitting device can judge the communications quality of he transmitted voice packets objectively and in real time.

In addition, the communications system 1600 of the present embodiment makes it possible to evaluate the communications quality while taking into account the effect on this communications quality of drop-out that occurs when compressed data is extracted, without transmitting uncompressed data via the network 520.

The communications system 1600 of the present embodiment is useful in the development, operation, maintenance and the like of voice communications systems.

Eighth Embodiment

A eighth embodiment of the present invention will be described with reference to FIG. 17.

Figure 17:
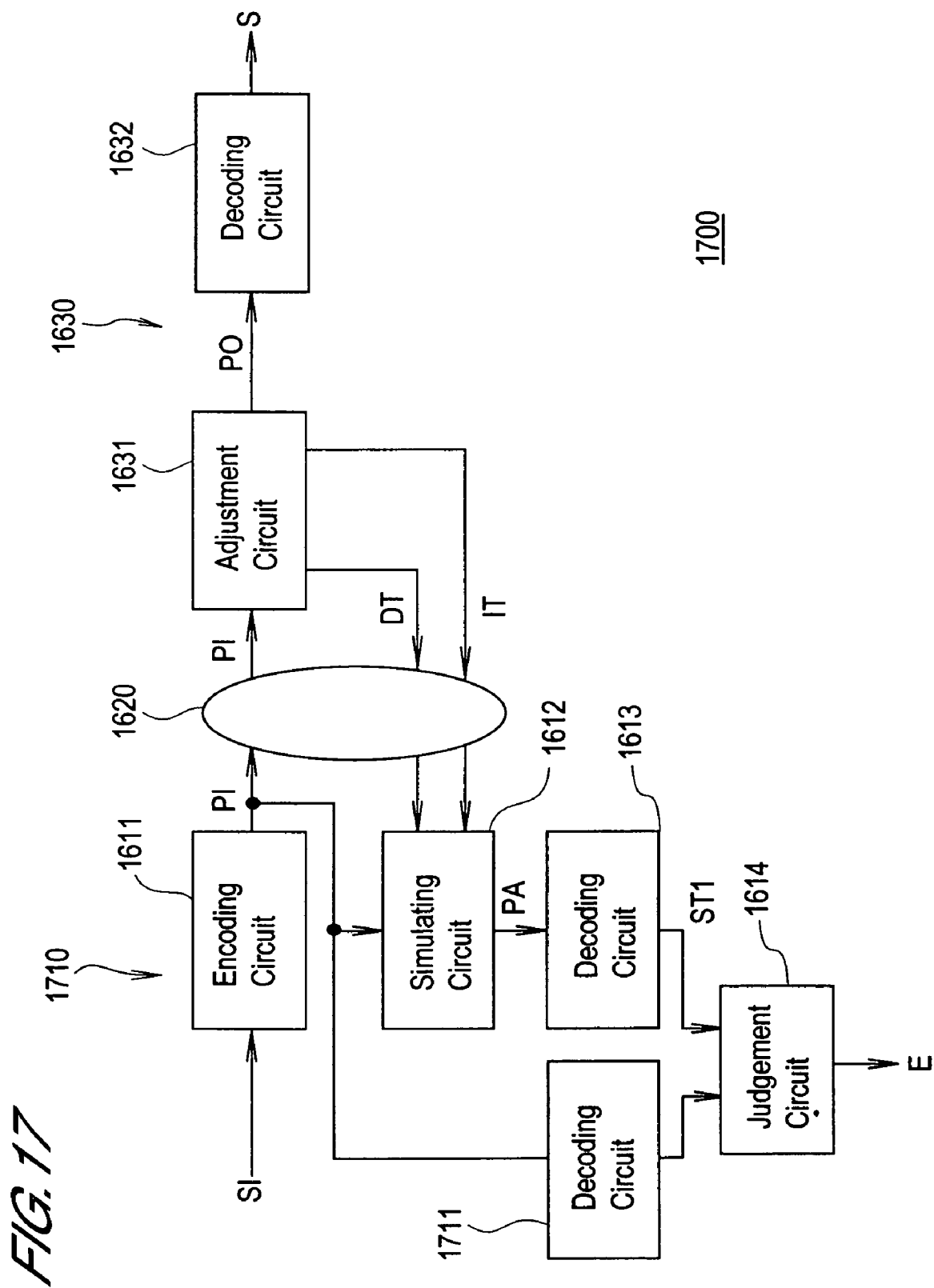
FIG. 17 is a block diagram which illustrates the construction of essential parts of a voice packet communications system constituting an eighth embodiment of the present invention.

FIG. 17 is a block diagram which illustrates the construction of the voice packet communications device 1700 of the present embodiment. In FIG. 17, constituent elements that are labeled with the same symbols as in FIG. 16 respective indicate constituent elements that are the same as in FIG. 16.

The packet transmitting device 1710 has a local reference voice decoding circuit 1711. The local reference voice decoding circuit 1711 produces voice information SR by decoding voice packets PI. This voice information SR is sent to the communications quality judgement circuit 1614.

The overall operation of the communications device 1700 of the present embodiment will be described below.

As in the seventh embodiment, the voice information SI is converted into voice packets PI by the voice encoding circuit 1611. These voice packets PI are output to the network 1620, network simulating circuit 1612 and local reference voice decoding circuit 1711.

The voice packets PI that are output to the network are received by the voice packet adjustment circuit 1631. The voice packet adjustment circuit 1631 adjusts the period of the voice packets PI, and inserts substitute data if necessary. As a result, voice packets PO are produced. In addition, the voice packet adjustment circuit 1631 produces the drop-out pattern information DT and substitution pattern information IT shown in FIGS. 12 and 13, forms this information into packets, and outputs these packets. The voice decoding circuit 1632 produces voice information S by extracting and decoding the voice information of the voice packets PO. This voice information S is output to the outside of the packet receiving device 1630.

The network simulating circuit 1612 modifies the voice packets PI using the information DT and IT received from the network 1620. The method of modification is the same as in the fifth embodiment (see FIG. 14). The voice packets PA obtained as a result of this modification are converted into voice information ST1 by the local voice decoding circuit 1613. The local reference voice decoding circuit 1711 produces voice information SR by decoding the voice packets PI.

The communications quality judgement circuit 1614 evaluates the voice quality by comparing the voice information ST1 and SR. The results of this evaluation are output from the communications quality judgement circuit 1614 as a voice quality index E.

The communications system 1700 of the present embodiment can output, automatically and in real time, a communications quality index E that objectively expressed the communications quality. The communications system 1700 of the present embodiment is useful in the development, operation, maintenance and the like of voice communications systems.

In the present embodiment, the packet transmitting device can judge the communications quality of transmitted packets automatically and in real time in cases where the communications quality on the outbound path and the communications quality on the return path are not the same.

It is extremely useful to construct communications systems using the techniques indicated in the first through eighth embodiments in combination. For example, by combining the fifth embodiment and the sixth embodiment, it is possible to perform both an evaluation of the communications quality that takes into account the effect on this communications quality of information drop-out that occurs when compressed data become to be extracted, and an evaluation of the communications quality that does not take this effect into account.

In cases where the present invention is used in multimedia communications, an image data queue and a voice data queue can be installed inside the FIFO memory 203. In such a case, a function distinguishing between image data and voice data is required in the constituent elements 201, 202 and 204 through 207 inside the voice packet adjustment circuit.

There are no restrictions on the voice compression method used in the present invention. Lossly compression or lossless compression can be used as the compression method. However, the fourth, fifth and seventh embodiments are especially useful in cases where lossly compression is used.

The present invention can be applied not only to systems in which bi-directional communications are performed, but also to systems in which uni-directional communications are performed.

What is claimed is:

1. A voice packet communications system, comprising:
an adjustment circuit which evens out the periods of voice packets received from a network, detects the dropout of voice packets and counts the number of dropped-out voice packets, or inserts substitute packets into the sequence of said voice packets, and outputs quality information that contains information that includes the number of dropped-out voice packets, the number of substitute voice packets, or the number of internally accumulated voice packets;
a decoding circuit which converts said voice packets adjusted by said adjustment circuit into voice information; and
a judgment circuit which judges the communications quality of the voice packets using said quality information.

2. A voice packet communications system, comprising:
an encoding circuit which produces voice packets from voice information, produces reference voice packets from said voice information, transmits said voice packets in accordance with a protocol of the type in which quality is not guaranteed, and transmits said reference voice packets in accordance with a protocol of the type in which quality is guaranteed;
a decoding circuit which converts said voice packets into voice information and converts said reference voice packets into reference voice information; and
a judgment circuit which judges the communication quality of said voice packets by comparing said voice information received from the network with said reference voice information received from the network;
wherein said encoding circuit is installed inside the packet transmitting device that transmits said voice packets and said reference voice packets to said network, and said decoding circuit and said judgment circuit are installed inside the packet receiving device.

3. The voice packet communications system according to claim 2, wherein said voice packets are compressed and said reference voice packets are not compressed.

4. The voice packet communications system according to claim 2, wherein said judgment circuit adjusts the period of the voice packets.

* * * * *